United States Patent [19]

Kobayashi et al.

[11] Patent Number: 4,706,202

[45] Date of Patent: Nov. 10, 1987

[54] CONTROL SYSTEM OF A VENDING MACHINE

[75] Inventors: Osamu Kobayashi; Masaki Akagawa; Masanori Tanaka, all of Sakado; Jun Ishii; Ryoji Yamagishi, both of Kawagoe, all of Japan

[73] Assignee: Nippon Coinco Co., Ltd., Tokyo, Japan

[21] Appl. No.: 773,309

[22] Filed: Sep. 5, 1985

[30] Foreign Application Priority Data

Sep. 7, 1984 [JP] Japan ................................ 59-187422

[51] Int. Cl.[4] ........................ G06F 15/20; G06F 11/16

[52] U.S. Cl. ...................................... 364/479; 194/217

[58] Field of Search ................ 194/217, 218; 364/478, 364/479; 221/2, 9; 222/2, 23, 638; 340/825.35

[56] References Cited

U.S. PATENT DOCUMENTS

| | | | |
|---|---|---|---|
| 4,350,238 | 9/1982 | Shah et al. | 364/479 X |
| 4,354,613 | 10/1982 | Desai et al. | 364/479 X |
| 4,359,147 | 11/1982 | Levasseur | 364/479 X |
| 4,512,453 | 4/1985 | Schuller et al. | 364/479 X |
| 4,593,361 | 6/1986 | Otten | 364/479 |
| 4,616,323 | 10/1986 | Hayashi | 364/479 |

*Primary Examiner*—Joseph Ruggiero
*Attorney, Agent, or Firm*—Spensley Horn Jubas & Lubitz

[57] ABSTRACT

The control system is constituted by a plurality of switches operated by inserted coins of different denominations, first register for storing amounts of inserted coins for each denomination and a second register for storing remaining amount of change. The amount of coins corresponding to operated switch is added to the content of the first register, 1 is added to the content of the second register in accordance with the denomination of the inserted coin, and 1 is substracted from the content of the second register in accordance with the denomination of payed out money. The selling price of a merchandise is subtracted from the total price of the inserted coins for calculating the amount of change. Selling is possible or not is determined by sequentially subtracting the price of the coins starting from a coin of the highest price from the change. The content of the first register is sequentially changed until the content exceeds the selling price and the selling price is subtracted from the content of the first register for setting the content to the amount of change for different denomination of coins.

6 Claims, 20 Drawing Figures

FIG. 6B

| PROCESSING | $R_A$ | $R_B$ | $R_C$ |
|---|---|---|---|
| | | | 50 |
| $R_C - 25 \rightarrow R_C$ | | | 25 |
| $R_B + 20 \rightarrow R_B$ | | 20 | |
| $R_A + 5 \rightarrow R_A$ | 5 | | |
| $R_B - 10 \rightarrow R_B$ | | 10 | 25 |
| $R_A + 10 \rightarrow R_A$ | 15 | | |
| $R_B - 10 \rightarrow R_B$ | | 0 | 25 |
| $R_A + 10 \rightarrow R_A$ | 25 | | |
| $R_C - 25 \rightarrow R_C$ | | | 0 |
| $R_B + 20 \rightarrow R_B$ | | 20 | |
| $R_A + 5 \rightarrow R_A$ | 30 | | |
| $R_B - 10 \rightarrow R_B$ | | 10 | |
| $R_A + 10 \rightarrow R_A$ | 40 | | |

CONTROL SYSTEM OF A VENDING MACHINE

BACKGROUND OF THE INVENTION

This invention relates to a control system of a vending machine, and more particularly a coin control unit generally termed a changer unit.

The coin control unit of a vending machine is the most important portion that accepts inserted coins, makes a judgment as to whether a merchandise selected by a purchaser is vendable or not based on the inserted coins, pays out a change, etc. Generally, the coin control unit is constituted by a mechanical unit that selects, accepts and returns inserted coins, and pays the change, and a circuit unit that controls the mechanical unit and executes an arithmetic operation necessary for the control.

An important problem of the vending machine is how to increase the chance of vending. In other words, how to increase the chance of vending by minimizing as far as possible the chance of rejection of vending due to shortage of the change. To this end, it is essential to always correctly know the amount of the coins stored in the machine that can be used as the change and to accurately judge as to whether vending is possible or not based on the stored amount the coins for the change. For example, although vending is possible in view of the sufficient stored coins that can be used as the change, if a misjudge is made such that vending is not possible due to the shortage of the stored coins the potential chance of vending will be slipped.

The prior art vending machine has generally been constructed such that a judgement is firstly made as to whether the vending requires a change or not and that where the vending requires the change, the vending is made possible only when the amount of the stored change coins exceeds a predetermined number. The judgment as to whether the amount of the change coins exceeds a predetermined number or not is made by the output signal of an empty switch installed at a predetermined position of a change coin tube. In this construction, it is necessary to install the empty switch at a position above a position corresponding to the maximum amount of the coins required for a change. Therefore, vending that can be made with a change less than the maximum amount of the change is judged impossible, which is of course an undesirable judgment. Especially, where a plurality of types denominations of the change coins are used so that it is necessary to install a plurality of empty switches for a plurality of change tubes, chances of vending would be lost more frequently. It means that even though the vending is actually possible it would be judged that the vending is impossible. In addition, installation of empty switches for respective change tubes increases the necessary space.

SUMMARY OF THE INVENTION

Accordingly, it is an object of this invention to provide an improved control system of an automatic vending machine capable of accurately judging the possibility of vending in accordance with inserted coins, thereby increasing as far as possible the chance of vending.

According to this invention, there is provided a control system of a vending machine comprising a plurality of switch means which are provided for respective types (denominations) of money (coin and bill) and operate when inserted monies pass through the switch means; first register means for storing amounts of inserted monies according to their types; means for adding amounts of monies corresponding to operated switch means to the contents of the first register means corresponding to the types of monies for changing the contents based on the judgment that the inserted monies are accepted under the condition that the operated switch means is returned to the original state within a predetermined period of time after the switch means was operated; second register means for storing remaining amounts of change for respective types of money; means for adding 1 to the contents of the second register means for changing the content thereof in accordance with the type of the inserted money and for subtracting 1 from the content of the second register means for changing the content thereof in accordance with the type of payed out money; means for subtracting the selling price of a merchandize from a total amount of inserted monies for calculating an amount of change to be paid out, for sequentially subtracting amounts of the monies starting from a money of highest denomination from the change thereby judging whether selling is possible or not and for generating a selling enabling signal when selling is possible; means for sequentially transferring the content of the first register means using the prices of the respective denomination as a unit amount from an amount corresponding to a higher denomination to an amount corresponding to a lower denomination until the content of the first register means corresponding to the lowest denomination exceeds the selling price; and then for subtracting the selling price from the content of the first register means corresponding to the type of lowest denomination, thereby setting the content of said first means to an amount of change for different denominations; and means for paying out money based on the amount of change for different denominations.

BRIEF DESCRIPTION OF THE DRAWINGS

In the accompanying drawings:

FIGS. 2A, 2B through 17 are flow charts for explaining the operation of one embodiment of the control system of this invention.

DESCRIPTION OF THE PREFERRED EMBODIMENT

Figure 1:
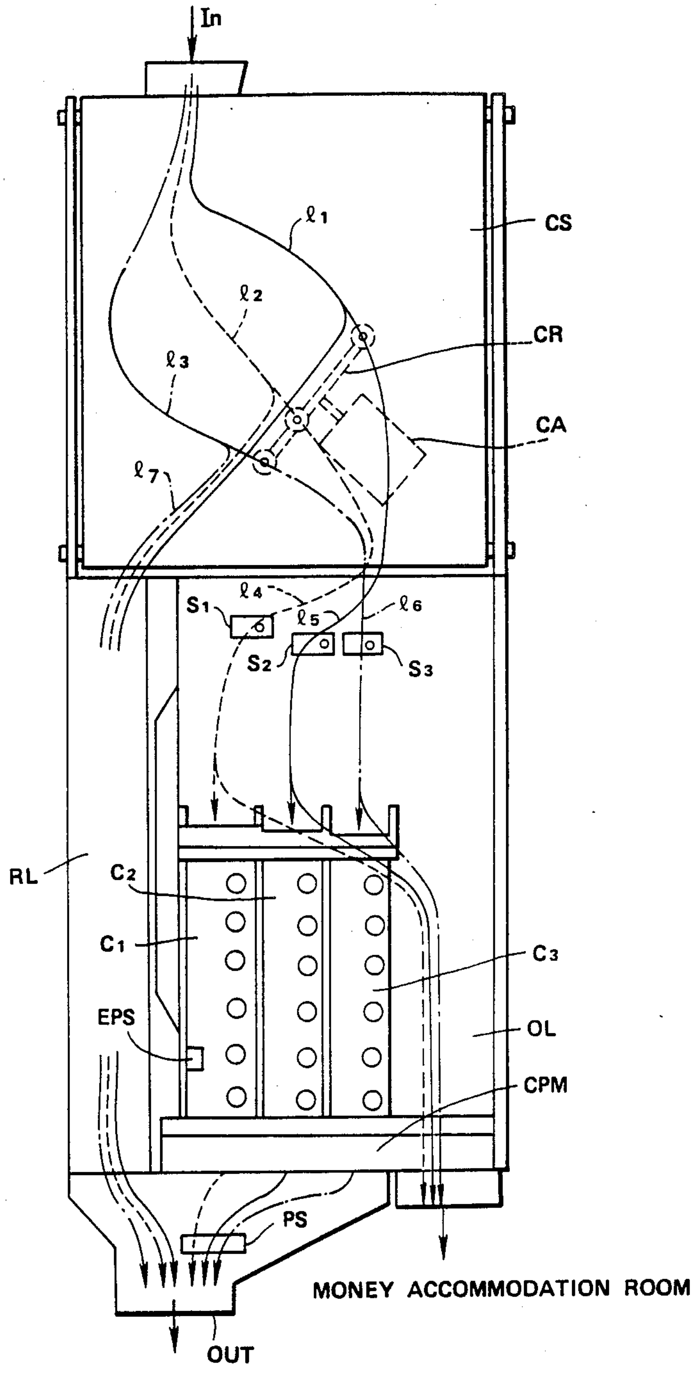
FIG. 1 a diagrammatic representation showing a coin control unit utilized in the control system of the automatic vending machine according to this invention.

The coin control unit will firstly be described. FIG. 1 shows the flow of coins in the coin control unit. In this embodiment, the coins used are 5 cent, 10 cent and 25 cent coins, but 1 dollar paper money can also be used when a paper money accepting mechanism is used.

In FIG. 1, a coin inserted through a coin slot In is guided to a coin sorting mechanism CS which sorts 5, 10 and 25 cent coins and identifies whether the coin is true or counterfeit. More particularly, a counterfeit inserted into the coin slot In is directed to either one of the passages $l_1$, $l_2$, and $l_3$ by the coin sorting mechanism CS and then conveyed to a coin return opening, not shown, through a passage $l_3$ and a return passage RL. A true 5 cent coin inserted into coin slot In operates a 5 cent coin detection switch $S_1$ after passing through passages $l_3$ and $l_4$ to be sent to a 5 cent coin accommodating tube $C_1$, while the true 10 cent coin operates a 10 cent coin detection switch $S_2$ after passing through passages $l_1$ and $l_5$ to be conveyed to a 10 cent coin accommodating tube $C_2$. In the same manner, a true 25 cent coin operates a 25 cent coin detection switch $S_3$ after passing through passages $l_3$ and $l_6$ to be conveyed to a 25 cent coin accommodating tube $C_3$. Near the inlet ports of passages $l_4$, $l_5$ and $l_6$ is provided a coin return mechanism CR actuated by a coin return solenoid coil CS so that when solenoid coil CS is energized, pins of the coin return solenoid coil CR respectively projecting to points near the inlet ports of the passages $l_4$, $l_5$ and $l_6$ are retracted so as to lead coins passed through passages $l_1$, $l_2$ and $l_3$ to passages $l_5$, $l_4$ and $l_6$ respectively. But when the coin return solenoid coil CS is deenergized, the pins are projected into passages $l_4$, $l_5$ and $l_6$ so as to guide the coins passed through passages $l_1$, $l_2$ and $l_3$ into passage $l_3$, thereby guiding the coin to the coin return opening, not shown, via return passage RL. Since the coin sorting mechanism CS is well known, its construction and operation would not be described.

5 cent, 10 cent and 25 cent coin accommodating tubes $C_1$, $C_2$ and $C_3$ constitute a change pay out tube which is automatically supplemented with 5, 10 and 25 cent coins inserted through coin slots In. More particularly, beneath the 5, 10 and 25 cent coin accommodating tubes $C_1$, $C_2$ and $C_3$ is provided a coin pay out mechanism CPM which is constructed to selectively pay out 5, 10 and 25 cent coins in the accommodating tubes $C_1$, $C_2$ and $C_3$ in accordance with a predetermined coin pay out instruction. More particularly by the selective operation of two solenoid coils A and B, the pay out tubes are selected and then by the operation of a coin pay out motor, not shown, coins are payed out from a selected one of the tubes. As the coin pay out mechanism may be used a coin pay out device disclosed in Japanese Utility model application No. 139,463/1979. The relationship between the coin pay out tubes and energization of the solenoid coils is shown by the following Table I.

TABLE I

| Pay out tube | Solenoid coil A | Solenoid coil B |
|---|---|---|
| $C_3$ (25¢) | 0 | 0 |
| $C_2$ (10¢) | 1 | 0 |
| $C_1$ (5¢) | 0 | 1 |

Remark:
1 energized state
0 deenergized state

When the numbers of coins received in respective tubes $C_1$, $C_2$ and $C_3$ exceeds predetermined numbers the tubes overflow and the overflown coins are guided to a coin collecting chamber, not shown, through a passage OL. An empty switch EPS is provided which operates when the member of coins in the 5 cent coin accommodating tube $C_1$ decreases below a predetermined number at a predetermined position of the 5 cent coin accommodating tube $C_1$. As will be described later, the empty switch EPS is provided for the purpose of detecting absence of the change.

5, 10 and 25 cent coins respectively payed out from the tubes $C_1$, $C_2$ and $C_3$ are detected by a pay out coin confirmation switch PS.

The operation of the control system of an automatic machine illustrated in FIG. 1 will be described with reference to the flow charts shown in FIGS. 2–17. At step 100 shown in FIG. 2, when a source switch is closed, a read only memory device (ROM), not shown, is initialized. Then at step 102, a predetermined area of a random access memory device RAM, not shown, is cleared followed by initialization of timers. In this embodiment, five types of timers that is 2 ms, 20 ms, 300 ms, 1 s and 5 s timers are used. Then a flag IDF is reset ("0") and a F is set ("1"). After that a terminal $P_{22}$ is set to "1". As will be described later, the flag IDF is set to "1" when either one type of the coins is inserted, whereas the flag F is a general purpose flag which is set to "1" while a coin is being payed out. Terminal $P_{22}$ produces a vending enabling signal V and a motor signal Mo instructing the rotation of a coin pay out motor to be described later. When terminal $P_{22}$ is set to "1", sending out of the vending enabling signal V and motor signal Mo is inhibited. The purpose of setting terminal $P_{22}$ to "1" is to prevent erroneous sending out of the vending enabling signal V or the motor signal Mo due to noise or the like during the period when the circuit is unstable in an interval immediately after closing the source switch.

Then at step 103, a 300 ms timer is started and flag inv is reset. The flag becomes "1" during the inventory operation to be described later.

Then at step 104, a judgement is made as to whether 300 ms timer has timed out or not. When the result is NO, the timer continues its operation, whereas when the result is YES, at step 105 a judgement is made as to whether flag F is "1" or "0". Since flag F has been set to "1", this flag is reset. Then at step 106, a judgement made as to whether the output of a carrier switch that detects the operating state of the coin pay out motor is "1" or "0". The coin pay out motor is used to drive the coin pay out mechanism CPM and while the coin pay out motor is paying out a coin, the output S(MO) of the carrier switch becomes "1", whereas when the coin pay out mechanism is in a waiting state, the output S(MO) becomes "0" when the output S(MO) of the carrier switch is "1", a 5 cent pay out routine 107 to be described later would be executed for returning the coin pay out motor to the waiting state. On the other hand, when the output S(MO) of the carrier switch is "0" and when the coin pay out motor is in the waiting state, a flag $S_{inv}$ would be set which becomes "1" when the inventory switch is operated. When the result of judgement executed at step 105 shows that flag F is "0", the flag $S_{inv}$ would immediately be reset without executing the processings described above including that of step 106.

Then the value of a total amount register, not shown, which stores the total amount of the money inserted is reset to 0 and then the content of a selling price setting register SP storing the set setting price is reset to 0.

Figure 13:
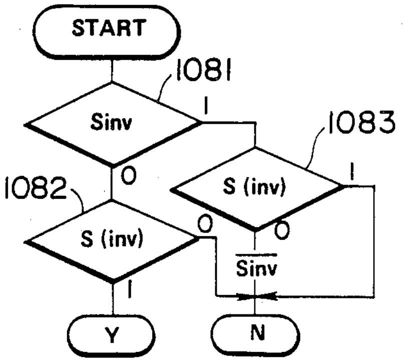

Then the processing is transferred to a subroutine 108 for checking as to whether there is an inventory input or not. The content of this subroutine 108 is shown in FIG. 13. More particularly, at step 1081, a judgement is made as to whether flag $S_{inv}$ is "1" or "0". Since flag $S_{inv}$ is "1", the processing is branched to step 1083 at which a judgement is made as to whether there is a signal $S_{(ivn)}$ from an inventory switch, not shown, or not. The inventory switch is operated to check the coins in the 5 cent accommodating tube $C_1$, the 10 cent accommodating tube $C_2$ and the 25 cent accommodating tube $C_3$. the inventory switch is operated, the coins in tubes $C_1$, $C_2$ and $C_3$ are sequentially payed out.

When the judgement executed at step 1083 shows that signal $S_{(inv)}$ is "0", flag $S_{inv}$ is reset and then it is judged that there is no inventory input. When the signal $S_{(inv)}$ is "1" it is judged that there is no inventory input.

Figure 11:
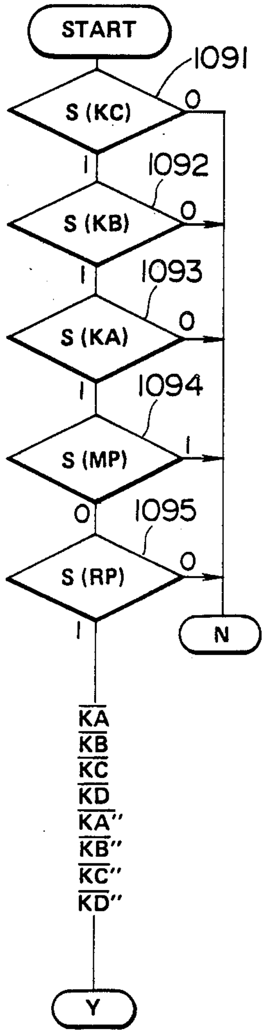

Then a subroutine 109 is executed. The content of this subroutine is shown in FIG. 11. At steps 1091, 1092, 1093, 1094 and 1095, the states of signals S(KC), S(KB), S(KA), S(MP) and S(RP) are sequentially judged. When either one of the signals S(KC), S(KB), S(KA), S(RP) is judged that it is "0" and when signal S(MP) is judged that it is "1", the program is branched to a key input $\neq 0$(N). Whereas when signals S(KC), S(KB) S(KA) and S(RP) are "1" and signal S(MP) is "0", flags KA, KB, KC, KD, KA", KB", KC" and KD" are reset and then the key input is made to be equal to 0(Y). The signal S(KC) becomes "0" when the 25 cent coin detection switch $S_3$ shown in FIG. 1 operates in response to an inserted 25 cent coin, signal S(KB) becomes "0" when the 10 cent coin detection switch $S_2$ shown in FIG. 1 operates, signal S(KA) becomes "0" when the 5 cent coin detection switch $S_1$ shown in FIG. 1 operates, signal S(MB) becomes "1" when a liquidation switch, not shown, (which is operated for returning or liquidation) is depressed, signal S(RP) becomes "0" when the coin pay out confirmation switch PS shown in FIG. 1 is operated. As will be described later, flags KA, KB and KC are set to "1" when 5 cent, 10 cent and 25 cent coin detection switches $S_1$, $S_2$ and $S_3$ operate, while flag KD is set to "1" when an one dollar paper money is detected by a one dollar paper money accommodating mechanism, not shown. Flags KA", KB", KC" are respectively set to "1" when 5, 10 and 25 cent coin detection switches $S_1$, $S_2$ and $S_3$ continue to operate for more than a predetermined time (300 ms), while flag KD is set to "1" when the condition of insertion of one dollar paper money continues over a predetermined timer (300 ms) is detected by the one dollar paper money accommodation mechanism, not shown.

In a subroutine 109, when it is judged that the key input is not equal to 0(N), the processing is transferred to subroutine 110 which is identical to subroutine 108 shown in FIG. 13. More particularly, at step 1081, a judgment is made as to whether flag $S_{inv}$ is "1" or "0". When it is judged that $S_{inv}=0$, at step 1082, the processing is advanced to step 1082. When it is judged that $S_{(inv)}$ is "1", the program is advanced to Y whereas when it is judged that $S_{(inv)}$ is "0", the processing is branched to N. At step 1081, when it is judged that $S_{inv}$="1" the processing is branched to step 1083. When it is judged that $S_{(inv)}$="0", flag $S_{inv}$ is reset, whereas when it is judged that $S_{(inv)}$="1", the processing is directly advanced to N. When N is judged by subroutine 110, the sequence again returned back to subroutine 109. When Y is judged by subroutine 110, an inventory routine to be described later will be executed.

When it is judged that key input=0(Y) by the subroutine 109, after setting flag STB, the sequence is transferred to step 111. This flag becomes "1" when the vending machine is in the waiting state before commencing the vending operation.

At step 111 the contents of a total sum register K storing the total sum of various types of money, a 5 cent register RA storing the total sum of the money of inserted 5 cent coins, a 10 cent register RB storing total amount of money of inserted 10 cent coins, a 25 cent register Rc storing the total money amount of inserted 25 cent coins, and an 1 dollar register RD storing the total amount of 1 dollar paper monies are all made "0". After that, flags KA, KB, KC, KD, KA', KB', KC' and KD' are reset. Flags KA', KB', KC' and KD' are set when the 5 cent, 10 cent, and 25 cent coin detection switches $S_1$, $S_2$ and $S_3$ are reset to nonoperative states after operating for a time of less than 300 ms. Then the flag F is set and the program is transferred to a money receipt processing subroutine 112 shown in FIG. 9.

Waiting State

Figure 9:
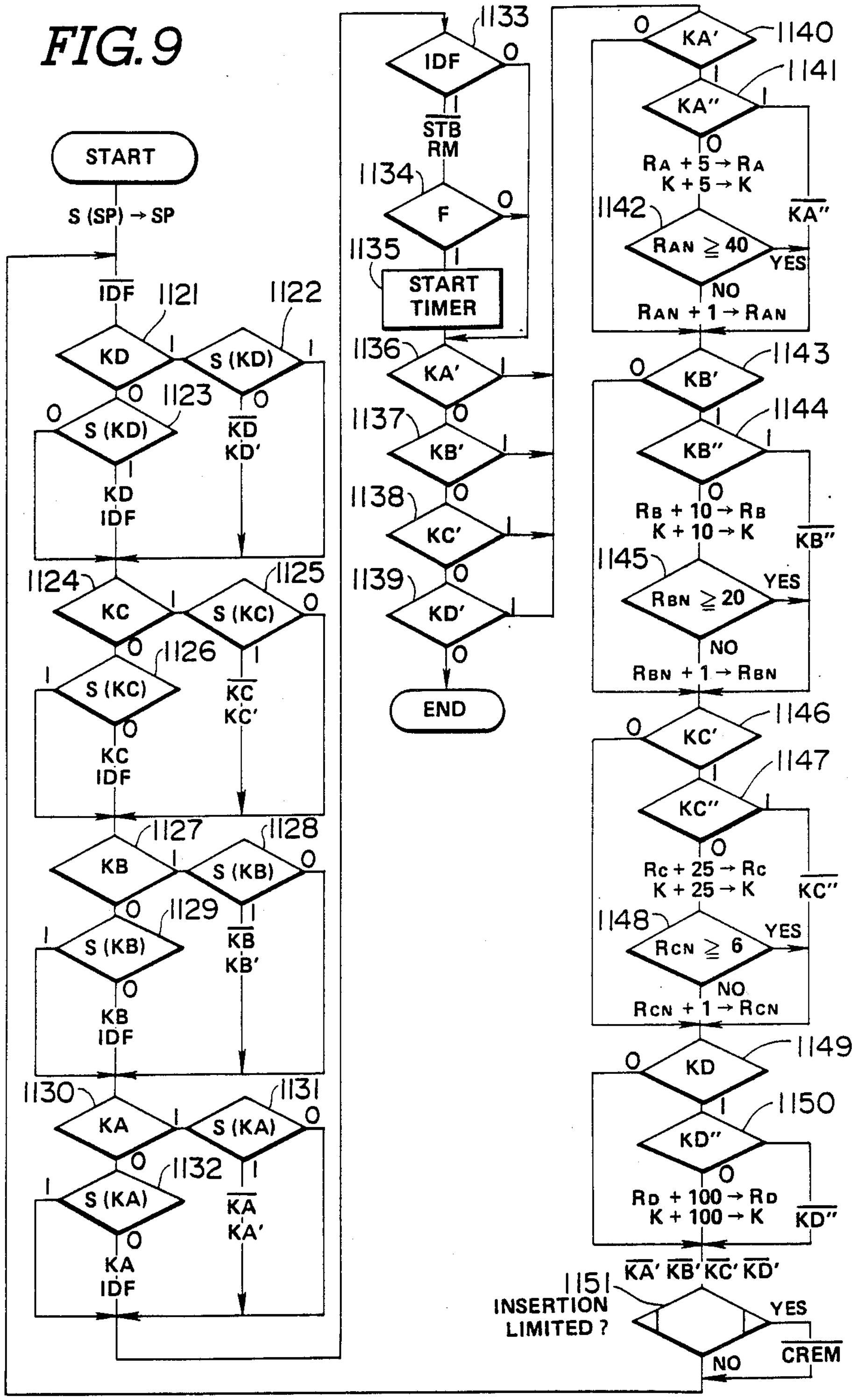

A waiting state in which no 5 cent, 10 cent, 25 cent coin and one dollar paper money is inserted will now be described. As shown in FIG. 9, a price signal S(SP) representing the price of a merchandize which is outputted from a selling price setting switch, not shown, is stored in a selling price register SP. When the vending machine is in the waiting state, flags KD, KC, KB, KA, KA', KB', KC' and KD' are all "0" while signal S(KD) is "0" (in this embodiment, when one dollar bill is inserted, signal S(KD) produced as a result of its insertion is "1"). On the other hand, signals S(KC), S(KB), S(KA) are all "1". As a consequence, the processing is transferred from step 1121 at which flag KD is judged to step 1123 at which signal S(KD) is judged and then transferred to step 1133 at which flag IDF is judged after executing step 1124, judging flag KC, step 1126 judging signal S(KC), step 1127 judging flag KB, step 1129 judging signal S(KB), step 1130 judging flag KA, and step 1132 judging signal S(KA). Since this flag IDF is "0", the processing is transferred to step 1136 for judging flag KA' and the execution of the subroutine 112 is completed after executing step 1137 judging flag KB', step 1138 judging flag KC', and step 1139 judging flag KD'.

After that, a price signal S(SP) is stored in the selling price register SP, flag F is reset, and signal CREM which drives the coin returning mechanism CR shown in FIG. 1 is generated. In response to this signal CREM, solenoid coil CS shown in FIG. 1 is energized to enable accommodation of coins or bills inserted.

Figure 12:
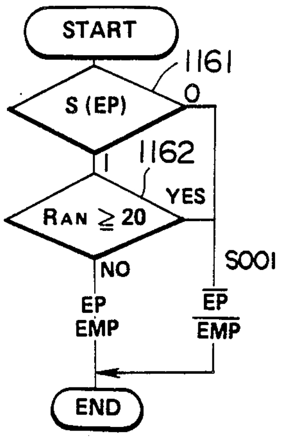

Then subroutine 116 is executed, the content thereof being shown in FIG. 12. More particularly, at step 1161, the signal S(EP) from the empty switch EPS shown in FIG. 1 is judged. When signal S(EP) is "1", that is when the height of 5 cent coins in the 5 cent coin accommodation tube $C_1$ shown in FIG. 1 is lower than the position at which the empty switch EPS is installed, the sequence is transferred to step 1162 to check whether the content of 5 cent coin remaining amount register $R_{AN}$ is higher than 20 or not. In this embodiment, 5 cent coin remaining number register $R_{AN}$ storing the remaining number of the 5 cent coins in the 5 cent coin accommodating tube $C_1$, 10 cent coin remaining number register $R_{BN}$ storing, the number of 10 cent coins remaining in the 10 cent coin accommodating tube $C_2$, 25 cent coin remaining number register $R_{CN}$ storing the number of 25 cent coins remaining in the 25 cent coin accommodating tube $C_3$ are provided. The count of each of the registers $R_{AN}$, $R_{BN}$ and $R_{ON}$ is incremented by 1 each time a coin is inserted into either one of tubes $C_1$, $C_2$ and $C_3$, and their counts are decremented by "1" each time coins are payed out from respective tubes $C_1$, $C_2$ and $C_3$.

At step 1162, if the count of the 5 cent coin remaining number register $R_{AN}$ is less than 20 (NO), an empty signal EP showing shortage of the change is generated and flag EMP showing shortage of the change is set. At step 1161, when signal S(EP) is judged "0", that is the level of the 5 cent coins in the 5 cent coin accommodating tube $C_1$ shown in FIG. 1 is higher than the position at which the empty switch EPS is installed, and when the count of the 5 cent coin remaining number register $R_{AN}$ is judged to be larger than 20 (YES), at step 1162, the empty signal would not be generated and flag EMP is reset, thus finishing subroutine 116.

Then flag F is set and the program is transferred to subroutine 117 which is identical to the subroutine 112 described above. In this case, the processings of subroutine 117 are identical to those of subroutine 112.

After resetting flag F, the program is transferred to subroutine 118 which is identical to subroutines 108 and 110 described above so that a judgement is made as to whether there is an inventory input or not.

Figure 14:
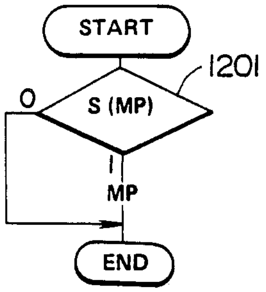

When there is the inventory input, the program is branched to an inventory routine 119 to be described later, whereas when there is no inventory input the program is transferred to subroutine 120 which executes processings corresponding to the operation of the liquidation switch, not shown, the content of subroutine 120 being shown in FIG. 14. More particularly, at step 1201, signal S(MP) showing the operating state of the liquidation switch is judged. As above described the liquidation switch is operated for the purpose of returning money or for liquidating after purchasing the merchandize (returning of the change). At step 1201, when signal S(MP) is judged as "1", flag MP is set, thus completing this sub-routine. At step 1201, when signal S(MP) is judged "0", this subroutine would be completed without executing any processing.

Then at step 121, flag MP is judged. When flag MP is "1", the program is branched to manual money returning routine 122 to be described later. When flag MP is "0", the program is transferred to step 123.

At step 123 a selling commencement signal S(SELL) which becomes "0" when the selling of the merchandize is started is judged. At this time, since the selling is not started, signal S(SELL) is "1". Then at the next step 124, flag STB showing the waiting state or not is judged. At this time, since flag STB is "1" (waiting state), after setting flag STB, the procedure is branched to step 111. Thereafter, so long as the vending machine is in the waiting state, a loop including subroutines 116, 117, 118 and 120 and steps 121, 123 and 124 is repeatedly executed.

The money receipt operation, selling operation, money collecting operation, and coin pay out operations executed when a coin or a bill is inserted will be described. Suppose now that the selling price of the merchandize, that is, the value stored in the selling price register SP is 35 cent and that two 25 cent coins are inserted. The money receipt operation at this time will be described as follows.

Money Receipt Operation

Assume now that insertion of the first 25 cent coin is detected by the money receipt processing subroutine 112. In this case, at step 1126 of the flow chart shown in FIG. 9, it is judged that signal S(KC) is "0". As above described, signal S(KC) is the output of switch $S_3$ that detects 25 cent coins. This signal S(KC) is "1" when switch $S_3$ is in the inoperative state, but becomes "0" when switch $S_3$ is operated by the passage of a 25 cent coin, and becomes "1" when the switch $S_3$ returns to the inoperative state when the 25 cent coin has passed. When signal S(KC) is judged "0" at step 1126, the flags KC and IDF are set. Then at step 1127, flag KB is judged. Since at this time flag KB is "0", the program is transferred to step 1129. At this time, since signal S(KB) showing the detection of a 10 cent coin is "1", the program is branched to step 1130 for judging flag KA. At this time, since flag KA is "0", the program is transferred to step 1132 and since signal S(KA) representing the detection of a 5 cent coin is "1", the program is branched to step 1133 from step 1132.

At step 1133, the flag IDF is judged. At this time, since the flag IDF is "1", flag STB showing the next waiting state is reset. Then the flag RM showing the money receipt state is set. Then, at step 1134, flag F is judged. At this time, since flag F is "1", the program is transferred to step 1135 for starting 2 ms, 20 ms, 300 ms, 1000 ms and 5000 ms timers. Then at steps 1136, 1137, 1138 and 1139, flags KA', KB', KC' and KD' are judged. At this time, since respective flags are "0" the processing of this subroutine is finished.

Upon completion of the execution of the money receipt subroutine 112, after setting the price signal S(SP) in the selling price register SP, resetting of flag F, sending out of signal CREM and setting of subroutine 116 and flag F, the program is transferred to money receipt processing subroutine 117. In this subroutine 117, since flag KC has been set to "1" by the money receipt processing subroutine 112, the program is branched to step 1125 from step 1124 shown in FIG. 9 for judging signal S(KC). When this signal S(KC) is "0", in other words when a 25 cent coin is still passing through switch $S_3$ shown in FIG. 1, the program will be directly branched to step 125 from step 1125. Thereafter, the same processings as those of the subroutine 112 will be executed. At step 1125, when signal S(KC) is "1", that is when a 25 cent coin has passed through switch $S_3$, flag KC is reset and flag KC' is set. Since flag KC' is judged "1" at step 1138, the program is branched to step 1140 from step 1138 for judging flag KA'. Since flag KA' is "0" at this time, the program is branched to step 1143 for judging flag KB'. Again, flag KB' is "0", the program is branched to step 1146 for judging flag KC'. At this time, since flag KC' is "1", the program is transferred to step 1147 for judging flag KC". When flag KC" is "0", 25 is added to the content of 25 cent register Rc storing the number of inserted 25 cent coins. Then 25 is added to the content of the total amount registor K storing the total money inserted, and the program is transferred to step 1148, at which a judgement is made as to whether the content of register $R_{CN}$ storing the remaining number of 25 cent coins is larger than 16 or not. If the content of the 25 cent coin $R_{CN}$ remaining number register $R_{CN}$ is less than 16, the content of the register $R_{CN}$ is incremented by 1, and then the program is transferred to step 1149. However, at step 1148, if it is judged that the content of the register $R_{CN}$ is larger than 16, the program will be branched directly to step 1149. Thus the 25 cent coin remaining number register $R_{CN1}$ stores 16 when the number of 25 cent coins accommodated in the 25 cent coins accommodating tube $C_3$ (FIG. 1) exceeds 16, whereas when the number of coins becomes less than 16, the register $R_{CN1}$ will store a value corresponding to the number of the accommodated coins.

Figure 16:
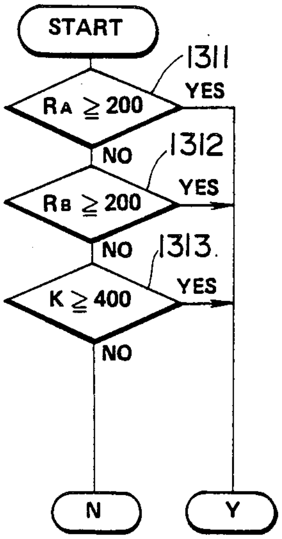

At step 1149, flag KD is judged. At this time, since flag KD is "0", flags KA', KB', KC' and KD' are reset and then the program is transferred to insertion limiting subroutine 1151 in which the limit of the inserted coins is judged. The content of the insertion limiting subroutine 1151 is shown in FIG. 16. Thus at step 1311, a judgement is made as to whether the content of 5 cent register $R_A$ storing the number of inserted 5 cent coins is larger than 200 or not. When the content is less than 200, at the next step 1312, a judgement is made as to whether the content of 10 cent register $R_B$ storing the number of inserted 10 cent coins is larger than 200 or not. Again, when the content is less than 200, at the next step 1313 a judgement is made as to whether the content of the total amount register K storing the total amount of inserted coins is larger than 400 or not. When the content is less than 400, it is judged that insertion limit is not made, whereas insertion limit is made when a relation $R_A \geqq 200$, $R_B \geqq 200$ or $K \geqq 400$ establishes in either one of the steps 1311, 1312 and 1313.

In subroutine 1151, if it is judged that insertion limit is made signal CREM is reset thereby rejecting subsequent insertion of the coins. When it is judged that insertion limit is not made, after resetting flag IDF, the program is returned to step 1121. At this time, since flags KD–KA and KD'–KA' are reset, after executing steps 1121, 1123, 1124, 1126, 1127, 1129, 1130, 1132, 1133, 1136, 1137, 1138 and 1139, the processing of this subroutine is completed. However, either one of the signals S(KD), S(KC), S(KB) and S(KA) has been termed to "1" by subsequent insertion of a coin, a processing corresponding thereto will be executed.

Figure 2A:
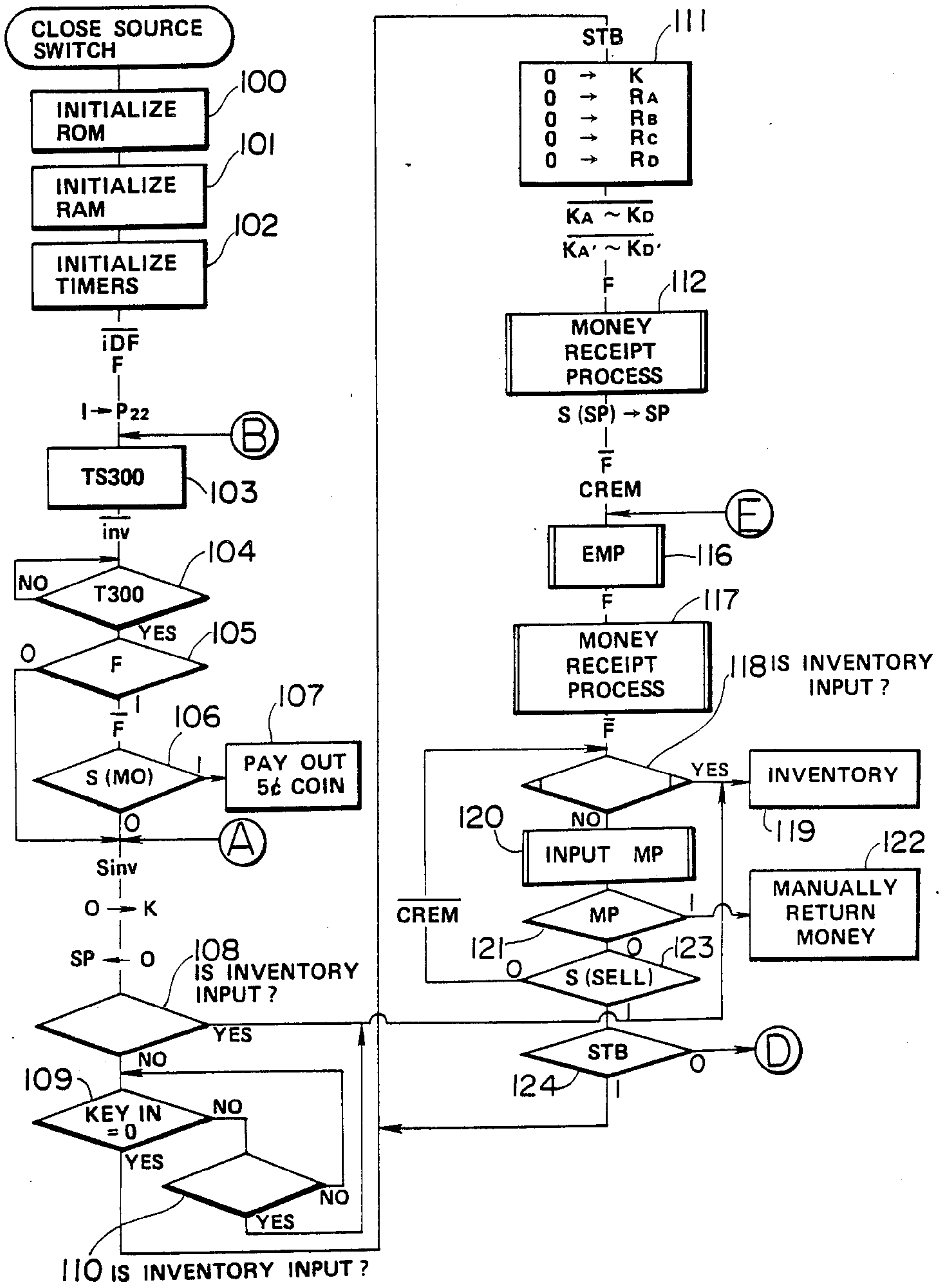
Figure 2B:
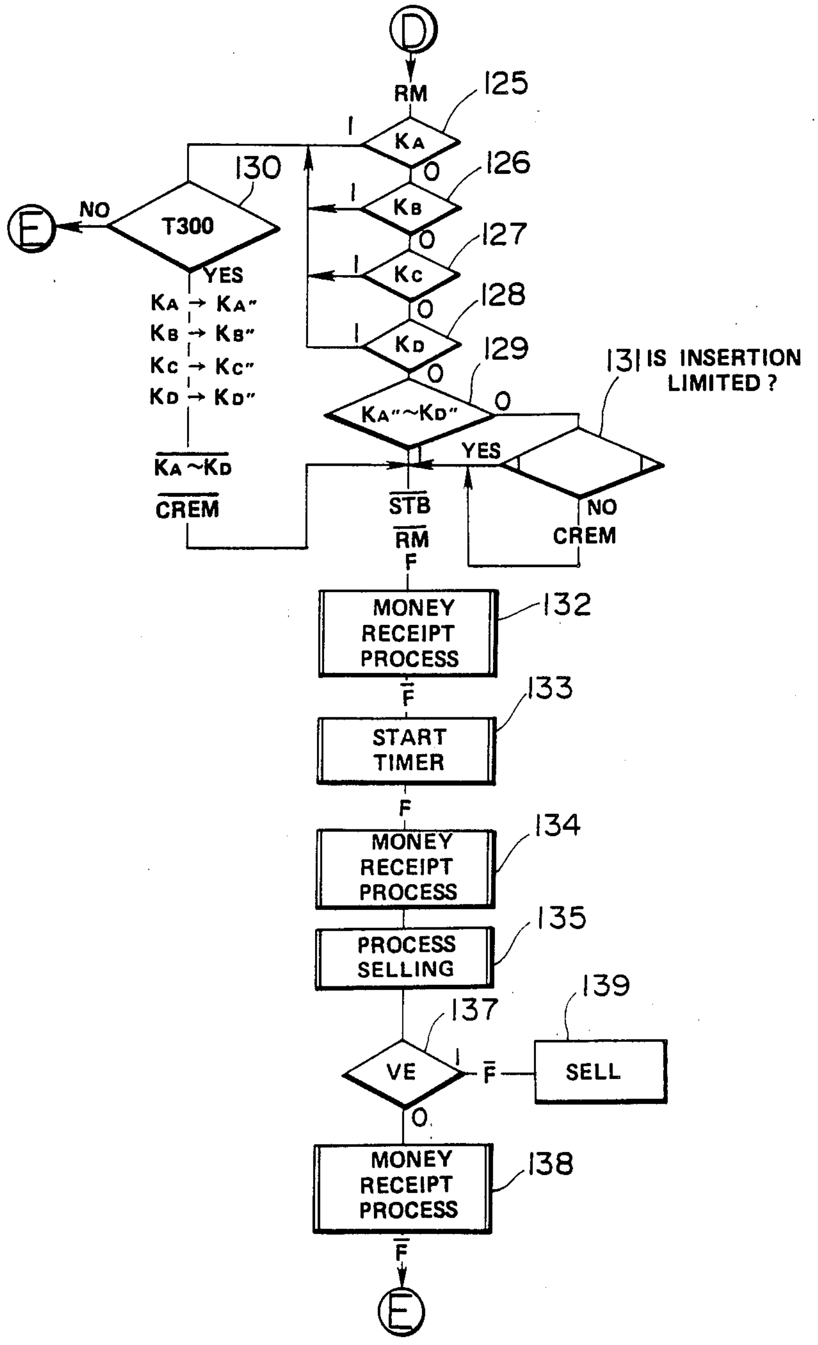

When it is judged that signal S(KC) is "0" at step 1125 of the subroutine 117, flag F is reset, subroutine 118 that judges whether there is an inventory input or not, and subroutine 120 in which inputting liquidation signal S(MP) is executed, a step 121 judging the flag MP is executed and step 123 judging signal S(SELL) is executed. The program is advanced to step 124 at which flag STB showing the waiting state is judged. At this time, since flag STB showing the waiting state is "0", after setting flag RM showing money receipt, the program is advanced to step 125, at which the flag KA is judged. At this time, since flag KA is "0", the program is advanced to step 126 for judging flag KB. Again, since flag KB is "0", the program is advanced to step 127 for judging flag KC. At this time, since this flag is "1", the program is branched to step 130 at which a judgment is made as to whether the 300 ms timer started at step 1135 (FIG. 9) has timed up or not. When the timing of the 300 ms timer is not over, after executing the money receipt processing subroutine, and setting of the flag F, the program is transferred to money receipt processing subroutine 117 so as to execute again, the judgment of signal S(KC) at step 1125 (FIG. 9). When signal S(KC) is again "0", after executing steps 1127, 1129, 1130, 1132, 1133, 1136, 1137, 1138 and 1139, the execution of this subroutine is completed. Then the program reaches step 130 after executing subroutines 118 and 120 and steps 121, 123, 124, 125, 126 and 127. The operation described above is repeated until signal S(KC) is judged "0" at step 1125 (FIG. 9) of subroutine 117 or the 300 ms timer is judged that its timing operation has over at step 130 (FIG. 2). Before judging that the 300 ms timer has timed up at step 130, when signal S(KC) is judged "1" at step 1125 (FIG. 9) of subroutine 117, that is when it is confirmed that the inserted 25 cent coin has passed through the 25 cent coin detection switch $S_3$, flag KC is reset and flag KC' is set. Then the program is transferred to step 1127 and then advanced to step 1138 after executing steps 1129, 1130, 1132, 1133, 1136 and 1137. At this time, since flag KC' is "1", the program is branched to step 1140 and then returned to step 1121 after executing steps 1141, 1143, 1144, 1146, 1147, 1148, 1149, 1150 and 1151, and the processing of subroutine 117 is completed after executing steps 1121, 1123, 1124, 1126, 1127, 1129, 1130, 1132, 1133 and 1136–1139.

When the execution of subroutine 117 is completed, the program reaches step 127 after executing subroutine 118 and 120, and steps 121, 123, 124, 125 and 126. Since flag KC is "0", the program is transferred to step 127. At this time, since flag KD is "0", the program is advanced to step 129 at which flags KA"–KD" are judged. At this time since flags KA"–KD" are all "0", the program is branched to subroutine 131 which is provided for the purpose of judging the insertion limiting of the coins inserted and identical to the insertion limiting subroutine 1151 (FIG. 9) described above. More particularly, in the subroutine 131, when the result of execution of the processing shown in FIG. 16 shows that limitation of the coin insertion is not necessary, a signal is sent out that enables accommodation of the inserted coins. When it is judged that coin insertion limitation is necessary, the flag CTB would be reset.

At step 1125 (FIG. 9) of subroutine 117, as signal S(KC) is judged that it is not "1" but at step 1300, the time af of the 300 ms timer is judged, that is the "0" state of signal S(KC) has continued over 300 ms (that is a 25 cent coin is passing through the 25 cent coin detection switch $S_3$) flags KA–KD are replaced by flags KA''–KD" on the assumption that the coins have clogged the passage. At this time, since only flag KC is "1" and other flags KD, KB, and KD are "0", flag KD" will be set to "1". That is, it is judged that 25 cent coins have clogged. Then flags KA–KD are reset, signal CREM is reset and flag STB is reset. As signal CREM is reset, the return solenoid coil CS shown in FIG. 1 is deenergized so as to prevent succeeding insertion of the coins.

Following the resetting of flag STB, flag RM showing the state of money receipt is reset, and after setting flag F, the program is transferred to the money receipt processing subroutine 132, which is identical to the money receipt processing subroutines 112 and 117 and its content is shown in FIG. 9.

When a first 25 cent coins is inserted, a normal money receipt processing is executed (the money receipt processing is made without setting flag KC" to "1"), and when a second 25 cent coin is not yet detected by the 25 cent coin detection switch $S_3$, flags KA–KD and KA''–KD' are all "0", and signals S(KA)–S(KD) are all "1". As a consequence, the money receipt subroutine 132 does not execute any money receipt processing. Then at step 133, various timers are started and flag F is set. Then the program is transferred to the money input subroutine 134 which is identical to the subroutine described above. Again no money receipt processing is made.

Figure 10:
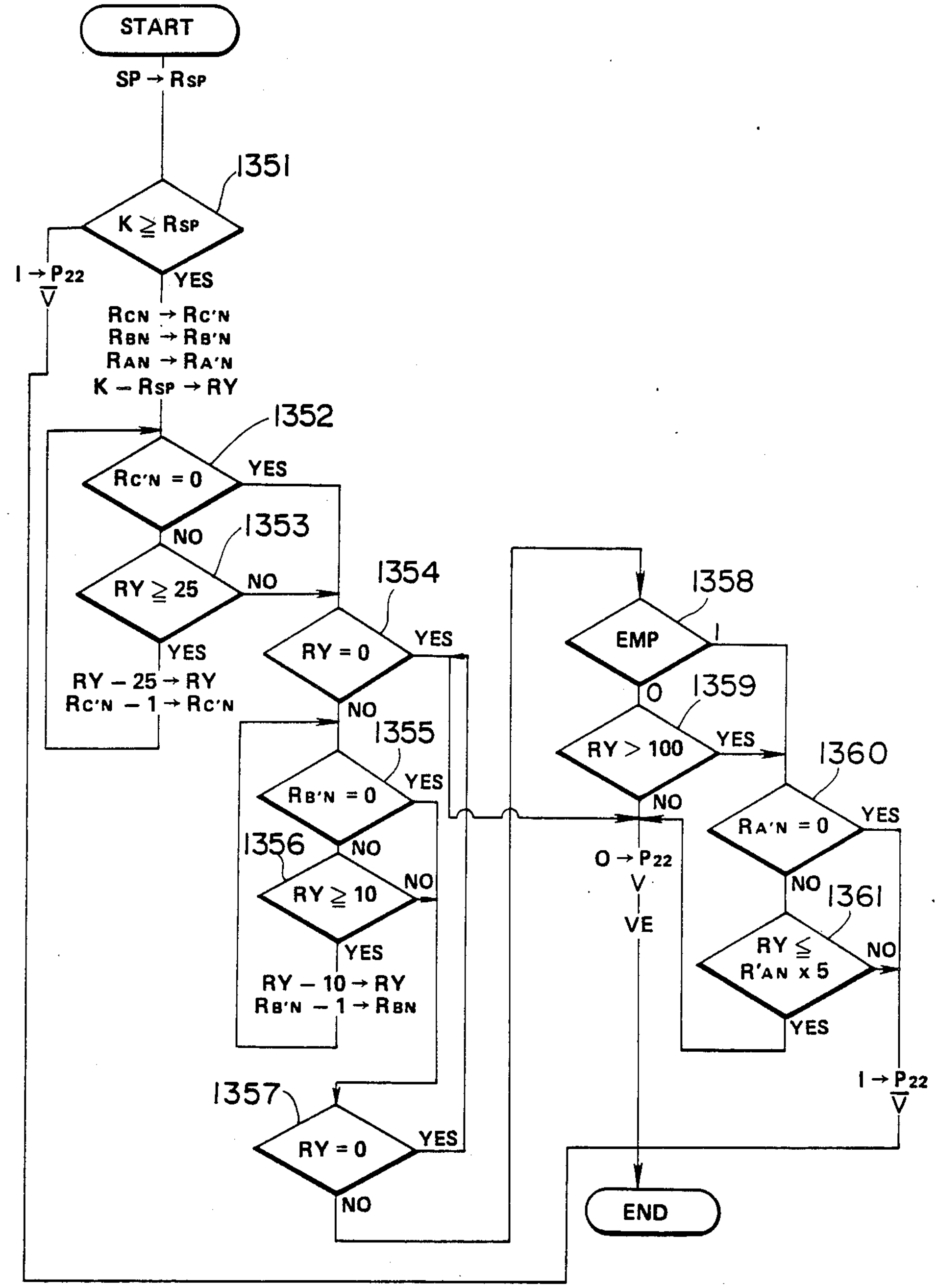

Then the selling processing subroutine 135 is executed, the content thereof being shown in FIG. 10. In this subroutine 135, the selling price of the merchandize stored in the selling price register SP is stored in the selling price register $R_{SP}$. Then at step 1351, a judgment is made as to whether the content of the total sum register K is larger than the content of the selling price register $R_{SP}$. However, in this example, the money receipt processing of only one 25 cent coin is made so that $K=25$, the relation $K \geqq R_{SP}$ does not hold, and the terminal $P_{22}$ is made "1". After resetting the selling enabling signal V, the processing of subroutine 134 is completed.

Then at step 137 (FIG. 2), flag VE is judged. As will be described later, the flag VE is set ("1") when the selling enabling signal V is produced. At this time, since flag VE is "0", the program is transferred to the money receipt processing subroutine 138 which is identical to the money receipt processing subroutine 134 described above, and no money receipt processing is made. Then flag F is reset and the program is returned to the subroutine 116.

After completing the money receipt processing of the first 25 cent coin, the second 25 cent coin is detected by the 25 cent coin detection switch $S_3$, and until signal S(KC) becomes "0", a loop including subroutines 116, 117, 118 and 1120, steps 121, 123–129, subroutines 131 and 132, step 132, subroutines 134 and 135, step 137 and subroutine 136 is repeatedly executed.

Under this state, it is supposed that a second 25 coin is inserted and that signal S(KC) becomes "0" before execution of either one of the money receipt subroutines 117, 132 and 134, for example 117 is executed. In this case, signal S(KC) is judged "0" at step 1126 shown in FIG. 9 and flags KC and IDF are set. At step 1133, since flag IDF is judged "1", flag STB is reset and flag RM is set. Then the program is transferred to step 1135 after executing step 1134 so as to start various timers. Then the money receipt processing subroutine 117 is completed after executing steps 1136–1139. Then flag F is reset, subroutines 118 and 120, steps 121, 123 and 129 and flag RM are set. After that, the program is advanced to step 130 after executing steps 125–126. When it is judged that the 300 ms timer is not timed out, the program is returned to subroutine 116. Thereafter, the operation described above is repeated until it is judged that the 300 ms timer has timed up at step 130. The operation made after the signal S(KC) has been judged "0" at step 1125 of subroutine 117 and the 300 ms timer has timed out are similar to those described above.

Upon completion of the money receipt processing of two 25 cent coins, the content of the 25 cent register Rc storing the total sum of the inserted 25 coins would become 50, whereas the content of the total sum register K storing the total amount of various moneies would become 50.

Selling Operation

After completing the money receipt processing and when the selling processing is reached, the selling of the merchandize is commenced. More particularly at step 1351 shown in FIG. 10, since the content of the total amount register K is 50 and the content of the selling register $R_{SP}$ is 35, a relation $K \geqq R_{SP}$ holds and it is judged YES. Then the contents of the 25 cent coin remaining number register $R_{CN}$ and the 10 cent coin remaining number register $R_{BN}$ and the 5 cent coin remaining number register $R_{AN}$ are transferred to processing registers $R_{CN}'$, $R_{BN}'$ and $R_{AN}'$ respectively and the content 35 of the selling register $R_{SP}$ is subtracted from the content 50 of the total sum register K and the difference 15 is stored in the change register RY. After that, at step 1352, a judgment is made as to whether the content of the register $R_{CN}'$ is 0 or not. At this time, since $R_{CN}'$ is at least more than 2, it is judged NO and the program is transferred to step 1353 at which a judgment is made as to whether the content of the change register RY is larger than 25 or not. Since the content of the change register RY is 15 as above described, $RY<25$, thus judging it as NO. Consequently, the program is branched to step 1354 at which a judgment is made as to whether the content of the change register RY is 0 or not. At this time, since $RY \neq 0$ it is judged NO and the program is branched to step 1355 at which a judgment is made as to whether the content of register $R_{BN}'$ is 0 or not. Where $R_{BN}' \neq 0$, it is judged NO, and the program is transferred to step 1356 at which a judgment is made as to whether the content of the change register RY is larger than 10 or not. At this time, since $RY \geqq 10$, it is judged YES, and 10 is subtracted from the content of change register RY and the difference is stored in the change register RY. Further 1 is subtracted from the content of register $R_{BN}'$ and the difference is stored in register $R_{BN}'$. Then the program is returned to step 1355. Suppose now that it is still $R_{BN}' \neq 0$, the program is transferred to step 1356. At this time, since the count of the change register RY is 5, the relation $RY \neq 10$ does not hold. Accordingly, it is judged NO, and the program is branched to step 1357 at which a judgment is made as to whether the content of the change register RY is 0 or not. At this time, since $RY=5$, that is not zero it is judged NO, and the program is transferred to step 1358 at which the flag EMP is judged. As above described, this flag is set to "1" when signal S(EP) from the empty switch EPS (FIG. 1) is "1" and the count of the 5 cent coin remaining number counter $R_{AN}$ is less than 20. If the flag EMP is "0", at step 1359, a judgment is made as to whether the content of the change register is 100, that is larger than 1 dollar or not. Since at this time, $RY<100$, it is judged NO, thus changing terminal $P_{22}$ is "0" for driving the pay out motor, not shown, to send out a selling enabling signal V. As a consequence, the merchandize is payed out from the merchandize pay out unit. Then flag VE showing that the machine is selling, is set, thus terminating the processing of the subroutine 135. At step 1353, if it is judged that $RY \geqq 25$ (YES), 25 is subtracted from the content of the change amount counter RY, and 1 is subtracted from the content of register $R_{CV}'$. The program is returned to step 1352. At step 1354, when it is judged that $RY=0$, the terminal $P_{22}$ is made "0". At step 1355, when it is judged that $R_{BN}'=0$, the program is transferred directly to step 357. When it is judged that EMP=1 at step 1358, and when at step 1359, it is judged that RY70, the program is advanced to step 1360 for judging as to whether the content of register $R_{AN}'$ is 0 or not, whereas when $R_{AN}''0$, at the next step 1361, a judgment is made as to whether the content of the change amount register RY is smaller than five times of the content of registe $R_{AN}'$ (that is whether the change can be paid with the content of the 5 cent coin remaining number register $R_{AN}$). When a relation $RY \leqq R_{AN}' \times 5$ holds, the terminal $P_{22}$ is made "0".

At step 1361, when it is judged that $RY > R_{AN}' \times 5$, it means that vending is impossible thus making "0" terminal $P_{22}$. As a consequence, the selling enabling signal V is reset to complete this subroutine 135.

As the selling processing subroutine 135 is completed, at step 137 (FIG. 2) flag VE is judged. At this time, since flag VE is set to "1", the flag F is reset and the program is advanced to the selling routine 139 shown in FIG. 3.

Figure 3:
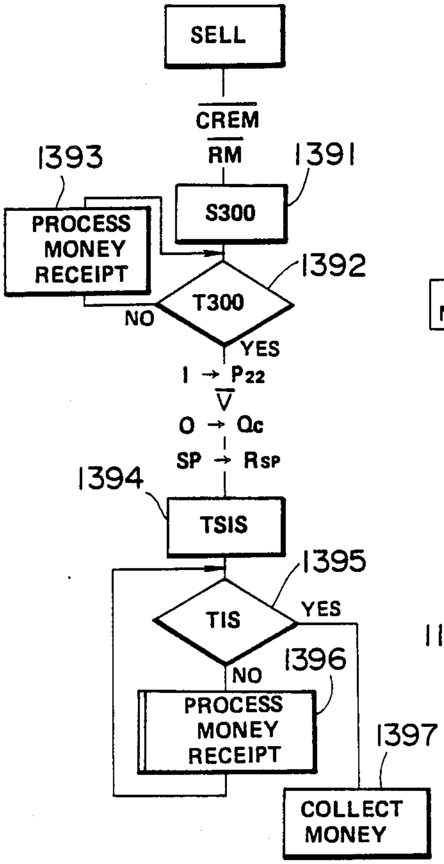

In the selling routine shown in FIG. 3, signal CREM and flag RM are reset. Then the program is transferred to step 1391 for starting the 300 ms timer. Then at step 1392, a judgment is made as to whether the 300 ms timer has timed out. When it is judged that this timer has timed out, after executing the money receipt processing subroutine 1393, the program is returned to step 1392. The money receipt subroutine is identical to that shown in FIG. 9, and after resetting signal CREM, a coin receipt processing which operates switches $S_1$, $S_2$ and $S_3$ is executed. At step 1392, when it is judged that the 300 ms timer has timed up, terminal $P_{22}$ is set to "1", the selling enabling signal V is reset, the content of the inventory register Qc to be described later is made "0", and the content of the selling price register is transferred to the selling register $R_{SP}$. Then at step 1394, the 1s timer is started. Then at step 1395, a judgment is made as to whether the 1s timer has timed up or not. When the timer is not yet timed out, after executing the money receipt processing subroutine 1396, the program is returned to step 1395. The money receipt processing subroutine 1396 is identical to that shown in FIG. 9. At step 1395, when it is judged that the 1s timer has timed out, the program is transferred to the money collection routine 1397.

Money Collection Operation

Figure 6A:
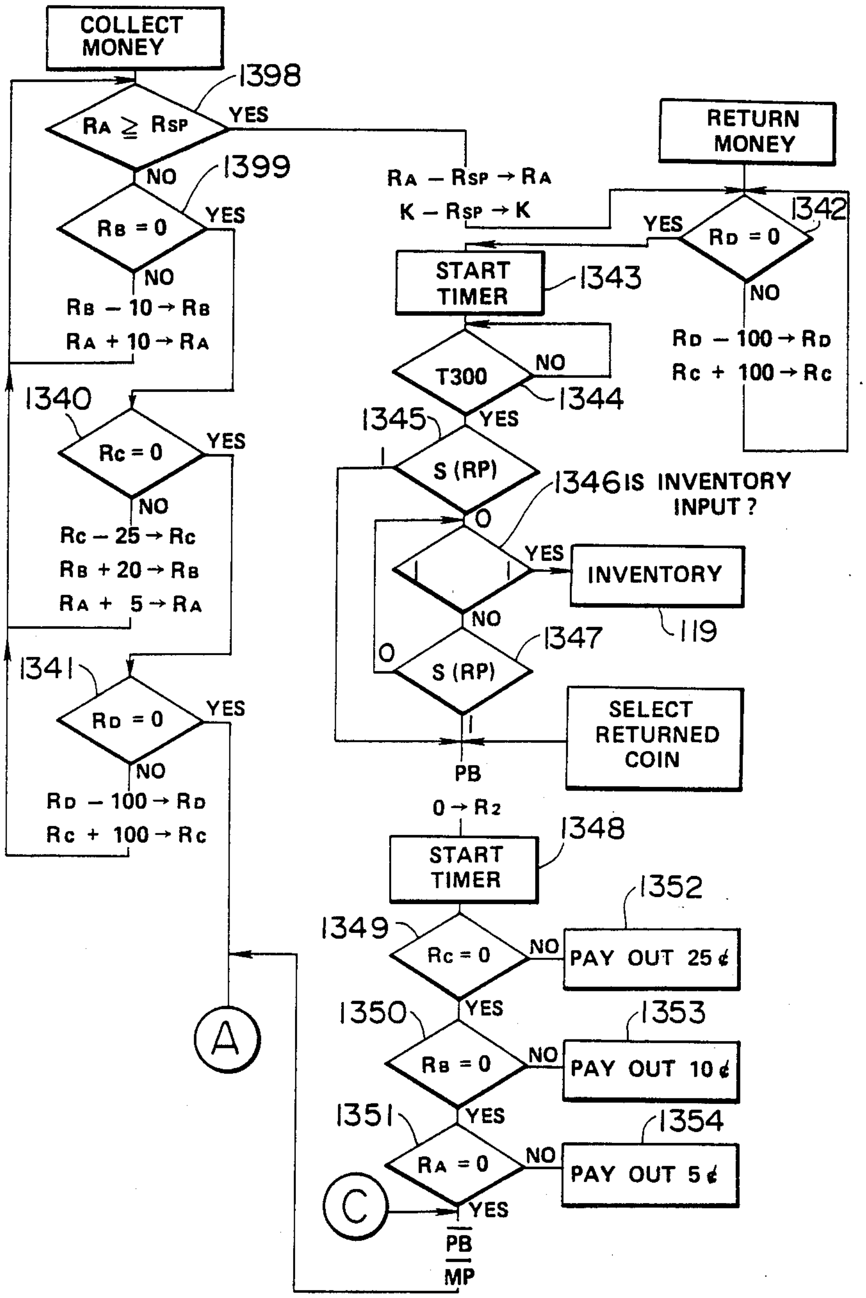

The money collection routine 1397 is shown in FIG. 6. In this routine, at step 1398, a judgment is made as to whether the content of the 5 cent register $R_A$ storing the total number of inserted 5 cent coins is larger than the content of a selling register $R_{SP}$ storing the price of the merchandize. At this time, since the inserted coins are only two 25 cent coins, $R_A \geqq 0$ and relation $R_A \geqq R_{SP}$ does not hold. Accordingly, the result of judgment at step 1398 is NO, and the program is advanced to step 1399 at which a judgment is made as to whether the content of the 10 cent register $R_B$ storing the total number of 10 cent coins inserted is 0 or not. At this time, since no 10 cent coin is inserted $R_B=0$. Accordingly, the result of judgment at step 1399 is YES and the program is advanced to step 1340 at which a judgment is made as to whether the content of the 25 cent register Rc storing the total number of inserted 25 cent coins is 0 or not. The content of register Rc is 50 as a result of insertion of two 25 cent coins so that $Rc \neq 0$. Thus the result of judgment at step 1340 is NO. Then 25 is subtracted from the contents of the 25 cent register c and 20 is added to the content of 10 cent register $R_B$. At the same time, 5 is added to the content of the 5 cent register $R_A$. Thereafter the program is returned to step 1398 at which a judgment is made again as to whether $R_A \geqq R_{SP}$ or not. At this time, since $R_A=5$, $R_A<R_{SP}$ and the result of judgment is NO, the program is transferred to step 1399. The result of judgment executed at this step is NO because the content of register $R_B$ is 20. Then 10 is subtracted from the content of the 10 cent register $R_B$ and 10 is added to the content of the 5 cent register $R_A$. After that the program is returned to step 1398 and a judgment is made again as to whether $R_A \geqq R_{SP}$ or not, since $R_{SP}=15$, $R_A<R_{SP}$. Accordingly, the result of judgment executed at step 1398 is NO and the program is transferred to step 1399. Since $R_B=10$, 10 is subtracted from $R_B$, and 10 is added to $R_A$, thus returning the program to step 1398. At this time, since $R_A=25$, $R_A R_{SP}$, thus judging NO. As a consequence, the program is transferred to step 1399. Since $R_B=0$, result of judgment is NO and the program is branched to step 1340. Since $Rc=25$, 25 is subtracted from Rc, 20 is added to $R_B$ and 5 is added to $R_A$. Then, the program is returned to step 1398. Since $R_A=25$, a relation $R_A \geqq R_{SP}$ does not hold, so that the result of judgment at step 1398 is NO and the program is advanced to step 1399. At this time, $R_B=20$ so that the result of judgment at step 1399 is NO. Then, 10 is added to $R_A$, and program is returned to step 1398. Under this state, $R_A=40$. Thus, at step 1398, a relation $R_A \geqq R_{SP}$ holds which is judged as YES. Foregoing operations are shown in FIG. 6(B).

More particularly, initially the contents of 5 cent register $R_A$, 10 cent register $R_B$ and 25 cent register Rc are 0, 0 and 50 respectively. But the coins are sequentially changed to lower price coins until finally the contents of the register $R_A$, $R_B$ and Rc are made to be 40, 10 and 0 respectively so as to establish a relation $R_A \geqq R_{SP}$ at step 1398.

At step 1398, the relation $R_A \geqq R_{SP}$ holds and judged as YES. Then the content of the selling register $R_{SA}$ is subtracted from the content of the 5 cent register $R_A$ to change the content of 5 cent register $R_A$. At the same time, the content of the selling register $R_{SA}$ is subtracted d from the content of the total sum register K. At this time, since $R_A=40R_{SP}=35$ and $K=50$, as a result of the above described processings, the content of the 5 cent register $R_A$ becomes 5 while that of the total sum register K becomes 15.

Then at step 1342, a judgment is made as to whether the content of the 1 dollar register $R_D$ is 0 or not, which counts the total sum of the money caused by the insertion of an 1 dollar paper money. At this time, since $R_D=0$, the program is branched to step 1343 for starting Various Timers. Then at step 1344, a judgment is made as to whether the 300 ms timer has timed up. If not, the result of judgment is NO, and the program is returned to step 1344. When the timer has timed up, the program is advanced to step 1345 at which the output signal S(RP) of the payed out coin confirmation switch PS shown in FIG. 1 is judged. When the switch PS is in the waiting state, signal S(RP) is "1", whereas when the switch PS is in an operative state, signal S(RP) is "0". When signal S(RP) is "1" and the payed out coin confirmation switch PS is in the waiting state, flag PB showing money return is set, and the content of a no pay number register $R_2$ to be described later is made to 0. Then the coins are payed out. At step 1345, if S(RD)=0, that is the pay out coin confirmation switch PS is in an operative state, subroutine 1346 is executed for judging whether there is an inventory input. When the result of judgment is YES, the program is branched to an inventory subroutine 119, whereas when the result is NO, at step 1347, a judgment of signal S(RP) is made again. If signal S(RP) is "0", the program is returned to subroutine 1346, but when signal S(RP) is "1", the flag PS is set.

When the processing of making the content of no pay number register $R_2$ is completed, at step 1348, various timers are started. Then at step 1349, a judgment is made as to whether the content of the 25 cent register Rc is 0 or not. Since $Rc=0$, the result of judgment is YES. Then at step 1350, a judgment is made as to whether the content of the 10 cent register $R_B$ is 0 or not. At this time, since the content of the register $R_P$ is 10, at step 1350, it is judged that $R_B \neq 0$ and the program is transferred to 10 cent coin pay out routine 1353.

At step 1340, when it is judged that the content of the 25 cent register Rc is 0, at step 1341 a judgment is made as to whether the content of the one register $R_D$ is 0 or not. If $R_D \neq 0$, 100 is subtracted from the content of the 1 dollar register $R_D$ to change the content thereof. At the same time 100 is added to the content of 25 cent register Rc to increase the content thereof. If $R_D=0$, the flag $S_{inv}$ in FIG. 2 would be set. At step 1342, if it is judged that $R_D \neq 0$, 100 is added to $R_D$ and 100 is added to Rc thus returning again to step 1342. This means that an one dollar paper money is returned by changing it to 25 cent coins. At step 1340 when it is judged that $Rc \neq 0$, the program is transferred to a 25 cent coin pay out routine 1352 to be described later. At step 1351 when it is judged that $R_A \neq 0$, the program is transferred to a 5 cent coin pay out routine 1354. At step 1351, when it is judged that $R_A=0$ flags PB and MP are reset and then flag $S_{inv}$ shown in FIG. 2 is set.

Figure 7A:
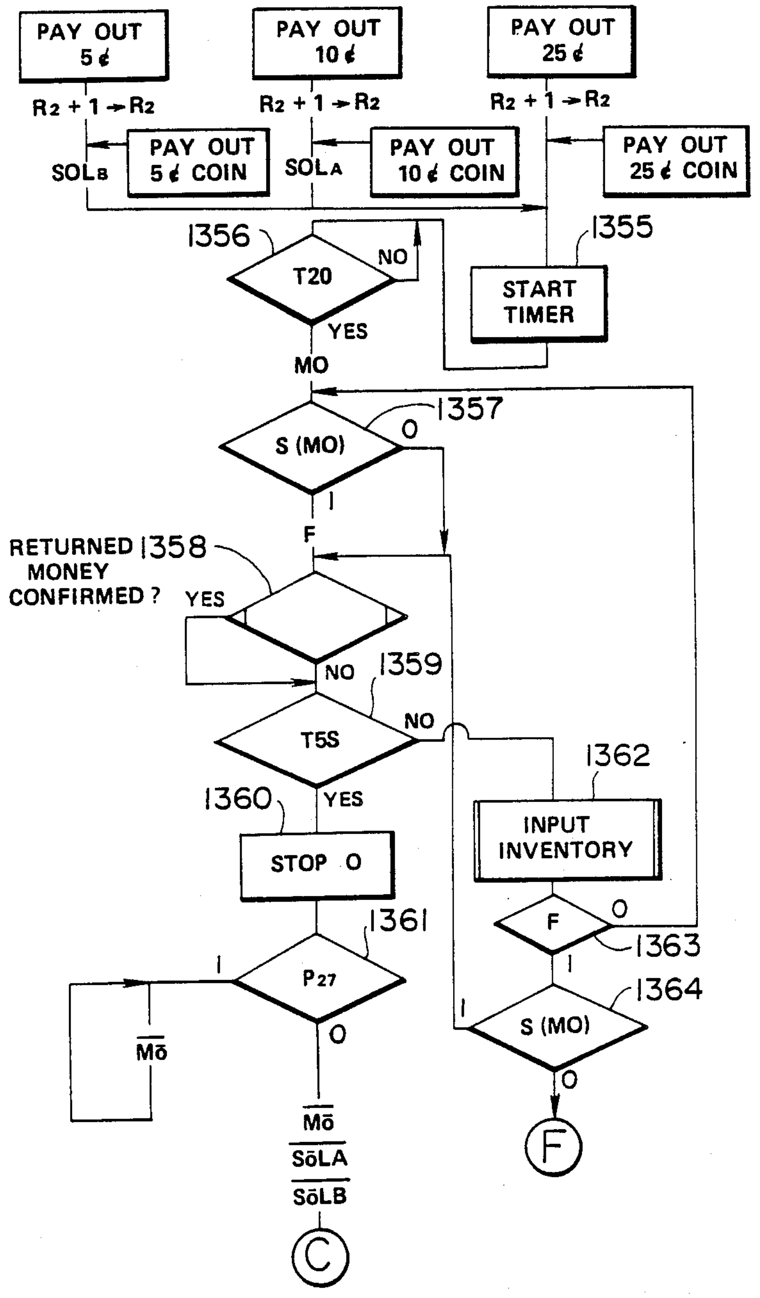
Figure 7B:
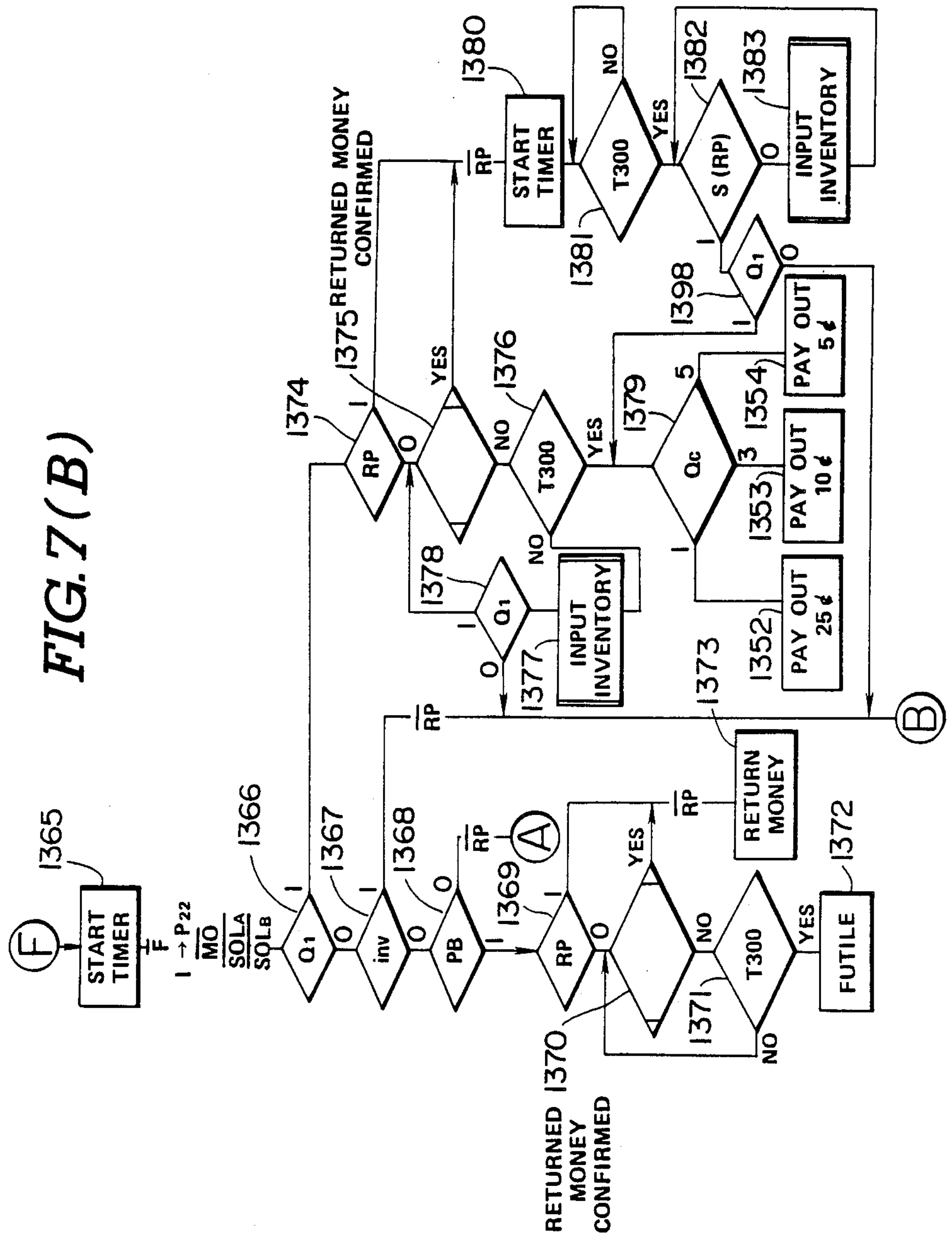

The coin pay out operation will now be described. In the foregoing example, the content of the 10 cent register $R_B$ was 10 and that of the 5 cent register $R_A$ was 5 so that it is possible to pay out one 10 cent coin and one 5 cent coin. At first, at step 1350 (FIG. 6) it is judged that $R_B \neq 0$ and the program is transferred to the 10 cent coin pay out routine 1350 which is shown in FIG. 7.

Coin Pay Out Operation

Figure 17:
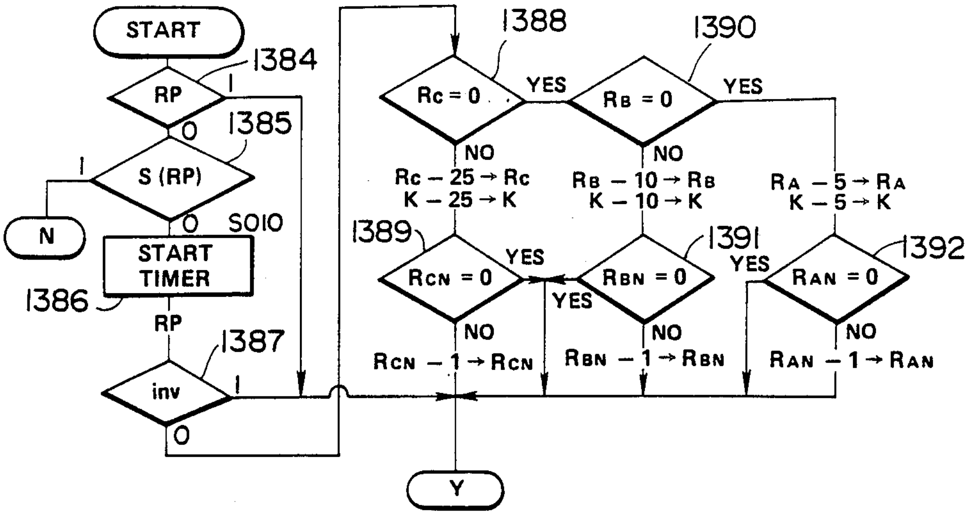

In the 10 cent coin pay out routine 1353, 1 is added to the content of the no pay number register $R_2$. Then the drive signal SOLA of solenoid coil A is generated. As above described when the solenoid coil A of the coin pay out mechanism (FIG. 1) is energized, pay out of 10 cent coins from the 10 cent coin accommodating tube $C_2$ becomes possible. Then at step 1355 various timers are started. Then at step 1356, a judgment is made as to whether the 20 ms timer has timed out. If the result of judgment is NO, the program is again returned to step 1356, whereas the result of judgment is YES a motor drive signal 0 that drives the coin pay out motor is generated. Allowance of 20 ms is set for ensuring the operating time of the solenoid coil. Then a signal S(M0) from a carrier switch, not shown, actuated by the rotation of the coin pay out motor is judged. As above described the signal S(M0) is 0 when the coin pay out motor is in the waiting state, "1" when the motor is rotated for paying out the coin, and returns "D" when the coin pay out operation is completed. At step 1357, when it is judged that signal S(M0) is "1", after setting the flag F the program is transferred to subroutine 1358. At step 1357 if it is judged that signal S(M0) is "0" the program is directly transferred to subroutine 1355 which executes the coin return confirmation judgment and its construction is shown in FIG. 17. The flag RP which is set by the operation of the coin pay out confirmation switch PS (FIG. 1) is judged. At this time since RP is "0", at step 1385, the signal S(RP) is judged. When it is assumed that the coin pay out confirmation switch PS is not yet operated, signal S(RP) would be "1". That is result of judgment is NO, thus completing this subroutine 1358. On the other hand, when the coin pay out confirmation switch PS is operated and signal S(RP) is "0" at step 1386, various timers are started. After setting the flag RP, at step 1387 flag inv is judged. When flag inv is "1" that is in the inventory operation state, the result of judgment is YES and the execution of the subroutine 1358 is completed. On the other hand, if it is judged that flag inv is "0", at step 1388, a judgment is made as to whether the content of the 25 cent register Rc is 0 or not. At this time, since $Rc \neq 0$, at the next step 1390, a judgment is made as to whether the content of the 10 cent register $R_B$ is 0 or not. As above described, since $R_B$ is 10 at this time, the result of judgment is NO, then 10 is subtracted from the content of the 10 cent register $R_B$ to change the content thereof. Further 10 is subtracted from the content of the total sum register K. Then at step 1391, a judgment is made as to whether the content of the 10 cent coin remaining number register $R_{BN}$ is 0 or not. If $R_{BN}=0$, the result of judgment is YES, and the processing of this subroutine is completed. At step 1391, when it is judged that $R_{BN} \neq 0$, 1 is subtracted from the content of the 10 cent coin remaining number register $R_{BN}$ thus changing the content thereof. Since it has been judged that the result of judgment is YES, the processing of this subroutine is completed.

At step 1388, if it is judged that $Rc \neq 0$, 25 is subtracted from the content of the 25 cent register Rc, and 25 is subtracted from the content of the total sum register K. Then at step 1389, a judgment is made as to whether the content of the 25 cent coin remaining number register $R_{CN}$ is 0 or not. When $R_{CN} \neq 0$, 1 is subtracted from the content of the register $R_{CN}$. Further if $R_{CN}=0$, the result of judgment is YES, thus finishing this subroutine. At step 1390, if it is judged that $R_B=0$, 5 is subtracted from the content of the 5 cent register RA, and 5 is subtracted from the content of the total sum register K. Then at step 1392, a judgment is made as to whether the content of the 5 cent coin remaining number register $R_{AN}$ is 0 or not. If $R_{AN}=0$, 1 is subtracted from the content of the 5 cent coin remaining number register $R_{AN}$. If it is judged that $R_{AN}=0$, the processing of this subroutine 1358 is completed.

More particularly, in the subroutine 1358, when the coin pay out confirmation switched PS is not yet operated or has been operated, no processing is executed but when it is detected that the switch PS has been operated, predetermined values are subtracted from the contents of registers Rc, $R_B$, $R_A$, $R_{LN}$, $R_{BN}$ and $R_{AN}$ respectively in accordance with the contents of registers Rc, $R_B$, $R_A$, $R_{CN}$, $R_{BN}$ and $R_{AN}$.

Figure 15:
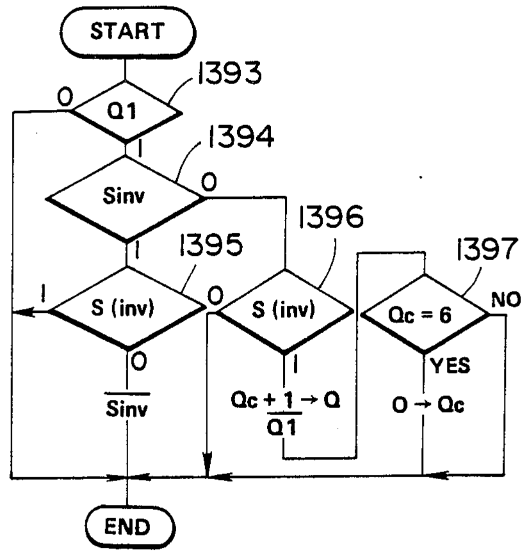

In this case (two 25 cent coins are inserted and a merchandize of a price of 35 cents is being sold), if the operation of the coin pay out confirmation switch PS is not yet confirmed by subroutine 1358, so that at step 1359, a judgment is made as to whether the 5 s timer has timed up. If the result of judgment is NO, the program is branched to subroutine 1362, the content thereof being shown in FIG. 15. In FIG. 15, at step 1393 the flag $Q_1$ is judged. At this time, since there is no inventory operation, flag $Q_1$ is "0". In this case, the processing of subroutine 1362 is completed. Then at step 1362, flag F is judged. If flag F is "0", the program is returned to step 1357. At step 1363, if it is judged that flag F is "1", at step 1364, the signal S(M0) from the carrier switch is judged. When it is judged that the signal S(M0) is "1" that is the carrier switch has been operated, the program is returned to subroutine 1358. At step 1364, if it is judged that the signal S(M0) is "0", the program is returned to step 1364.

More particularly even when the motor drive signal M0 has been generated, at step 1357, if it is not confirmed what the carrier switch has operated, in other words signal S(M0) has changed to "1", until the fact that the signal S(M0) has changed to "1" is confirmed at step 1357, a loop including subroutine 1358, step 1359, subroutine 1362, and steps 1363 and 1357 is repeatedly executed. At step 1357, it is confirmed that signal S(M0) has changed to "1". Then a loop including step 1359, subroutine 1362, steps 1363 and step 1364 and subroutine 1358 is repeatedly executed until at step 1364, it is confirmed that the signal S(M0) has changed to "0", that is the carrier switch has returned to the waiting state.

During the foregoing operation, at step 1359 if it is judged that the 5 s timer has timed up, at step 1360, the operation is stopped, and at the next step 1361, the signal of terminal $P_{27}$ is judged. When the operation is stopped, the signal at terminal $P_{27}$ becomes "0". If the signal of terminal $P_{27}$ is still maintained at "1", the motor drive signal M0 is stopped, whereas when the signal becomes "0", the motor drive signal M0, solenoid coil drive signals SOLA and SOLB are stopped. Thereafter, the flag PB shown in FIG. 6 is reset.

During the above described operation, if signal S(RP) becomes "0" and the operation of the coin pay out confirmation switch PS is confirmed in subroutine 1358, 10 is subtracted from $R_B$ and 10 is subtracted from K. Since the content of the 10 cent register $R_B$ was 10, its content is reduced to 0, and since the content of the total sum register K was 15 its content is reduced to 5.

At step 1365, various timers are started, flag F is reset, the voltage of terminal $P_{22}$ is changed to "1" and the motor drive signal M0 and the solenoid coil drive signals SOLA and SOLB are stopped. Then at step 1361, flag $Q_1$ is judged. At this time since flag $Q_1$ is "0", at the next step 1367, inv is judged If the flag inv is "0" at this time, at the next step 1368, flag PB is judged. At this time, since flag PB "1", at the next step 1369 flag RP is judged. If flag RP is "1" at step 1369, in other words, in the above described subroutine 1358, when signal S(RP) becomes "0" and flag RP is set, after resetting flag RP, the program is transferred to money return routine 1373. At step 1369, if it is judged that flag RP is "0", it means that even though a 10 cent coin has been paid, the pay out coin confirmation switch does not confirm the payed out coin. Then the program is transferred to subroutine 1370 where a judgment is made as to whether the money return has been confirmed or not, The subroutine 1370 is identical to the subroutine 1358 and its content is shown in FIG. 17. In the subroutine 1370, when the money return is confirmed, after resetting flag RP which has been set in subroutine 1370, the program is transferred to the money return subroutine 1373. Then the pay out operation of one 10 cent coin is completed Thus one 5 cent coin will be paid out.

In subroutine 1370, if it is judged that money return is not confirmed, at step 1371, a judgment is made as to whether the 300 ms timer has timed up. This timer was started at step 1365. If the result of judgment at step 1371 shows that the 300 ms timer has not timed up, subroutine 1370 is executed again, and this operation is repeated until a judgment is made at step 1371 as to whether the 300 ms timer has timed up: When money return confirmation is judgment subroutine 1370 before a judgment is made that the 300 ms timer has timed up, at step 1371, as above described, after resetting flag RP, the program is transferred to the money return subroutine 1373. At step 1371, if it is judged that the 300 ms timer has timed up, the program is transferred to a futile processing subroutine 1372 on the assumption that no 10 cent coin was payed out.

The money return routine 1373 is shown in FIG. 6 in which at step 1342 a judgment is made as to $R_D=0$. In this case, since $R_D=0$, at the next step 1343, various timers are started. Then at step 1344, if it is judged that the 300 ms timer has timed up, at the next step 1345, flag RP is set, and the content of the no pay number register $R_2$ is changed to 0 because signal S(RP) is "1" at this time. After that, at step 1348, various timers are started. Then at step 1349, a judgment is made as to whether $Rc=0$. At this time, since $Rc=0$, at the next step 1350 a judgment in made as to whether $R_B=0$ or not. At this time, since $R_B=0$, at the next step 1351, a judgment is made as to whether $R_A=0$ or not. At this time, since $R_D=5$, the result of judgment executed at step 1351 shows that $R_A\neq0$, and the program is transferred to the 5 cent coin pay out routine 1354 which is shown in FIG. 7 and identical to the 10 cent coin pay out routine described above.

When the 5 cent coin is normally payed out, the money return routine shown in FIG. 7 is reached. Then the money return routine shown in FIG. 6 is executed. At this time, at steps 1349, 1350, and 1351, it is judged that $Rc=0$, $R_B=0$ and $R_A=0$. Then flag PB is reset, and motor drive signal MP is stopped. After that flag $S_{inv}$ shown in FIG. 1 is set, whereby pay out of one 10 cent coin and one 5 cent coin has completed.

Although in the foregoing description, pay out control of 10 and 5 cent coins was described, it will the clear that the pay out control of a 25 cent coin can be made in the same manner.

The futile routine will now be described. When it is judged that the 300 ms timer has timed up at step 1371 shown in FIG. 7. The program is transferred to the futile routine 1372. The futile routine operates such that even when the pay out operations of the coins of the same type are repeated twice, the pay out of the coins can not be confirmed, the coins of the other type are payed out. The content of this futile routine is shown in FIG. 8.

Assume now that the content of the 25 cent register Rc is 0 and that the content of the 10 cent register $R_B$ is not 0, the 10 cent coin is payed out according to the 10 cent pay out routine. If we assume that the pay out of the 10 cent coin can not be confirmed and that the program has transferred to the futile routine 1372. In the futile routine shown in FIG. 8, at step 1400, a judgment is made as to whether the content of 25 cent register Rc is 0 or not. At this time, since $Rc=0$, at the next step 1401, a judgment is made as to whether the content of the 10 cent register is 0 or not. At this time, since $R_B\neq0$, at the next step 1402, a judgment is made as to whether the content of the no pay register $R_2$ is larger than 2 or not. At this time, since $R_2=1$, a relation $R_2\geqq2$ does not hold so that the program is transferred to a 10 cent pay out routine 1404, the content thereof being shown in FIG. 7. At first, 1 is added to the content of the no pay register $R_2$. At this time, since the content of the no pay register $R_2$ is 1, the content of the no pay register $R_2$ changes to 2. After that, the 10 cent coins are payed out in the same manner as above described. It is now assumed that at step 1371, it is judged that the 300 ms timer has timed up and that the program has transferred again to the futile routine 1372. In this case, at step 1402, a relation $R_2>2$ is established and the content of the 10 cent register is added to the content of the 5 cent register $R_A$ and the sum is stored in the 5 cent register $R_A$. At the same time, the content of the 10 cent register $R_B$ is reduced to 0 and the content of the 10 cent coin remaining number register $R_{BN}$ is also changed to 0. Then the program is transferred to a return money coin selection routine 1403 which is constituted by the steps following the flag PB setting step of the flow chart shown in FIG. 6. More particularly, following the setting processing of the flag PB, the content of the no pay number register $R_2$ is changed to 0. After that, at step 1348, various timers are started and at step 1349, a judgment is made as to whether $Rc=0$ or not. At this time, since $Rc=0$, at the next step 1350, a judgment is made as to whether $R_B=0$. Again $R_B=0$, at the next step 1351, a judgment is made as to whether $R_A=0$. Again $R_A\neq0$, so that the program is transferred to the 5 cent pay out routine 1354. The content thereof is shown in FIG. 7 and its operation is the same. In this case, however, the content of the 5 cent register $R_A$ has been changed by the addition of the content of the 10 cent register $R_B$, instead of 10 cent coins, 5 cent coins would be payed out.

Figure 8:
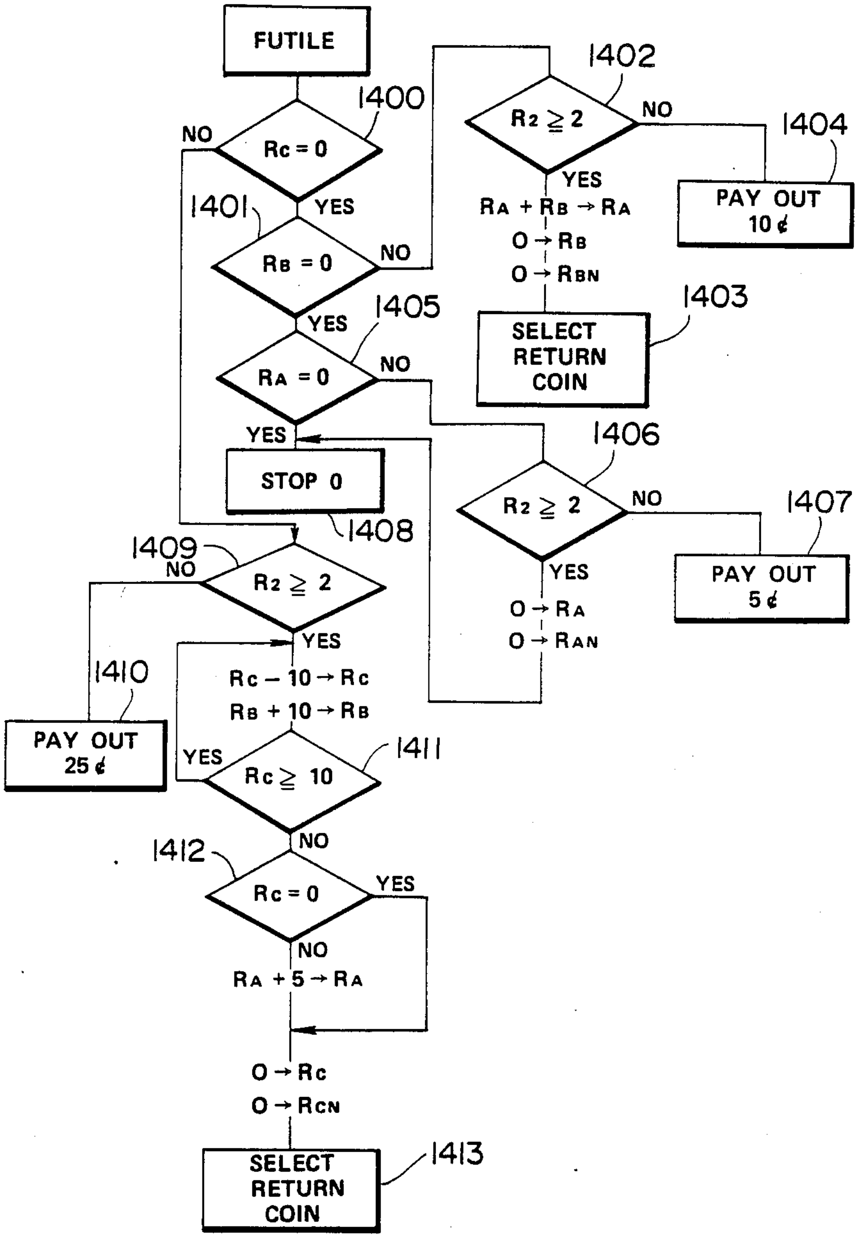

At step 1401 shown in FIG. 8, when it is judged that $R_B=0$, at step 1405, a judgement is made as to whether the content of the 5 cent register $R_A$ is 0 or not. When it is judged that $R_A \neq 0$, at step 1406, a judgement is made as to whether the content of the no pay number register $R_2$ is larger than 2 or not. When a relation $R_2>2$ does not hold, the program is transferred to the 5 cent pay out routine 1407, the content thereof being shown in FIG. 7. At step 1406, if the relation $R_2>2$ is established, the content of the 5 cent register $R_A$ is changed to 0, and the content of the 5 cent coin remaining number register $R_{AN}$ is changed to 0. Then at step 1408, a predetermined stopping processing is executed. At step 1405, when it is judged that $R_A=0$ the program is at once advanced to the stop processing step. More particularly even when the 5 cent coin pay out processing is executed twice, the pay out coin can not be confirmed, then the stopping processing is executed.

For the purpose of paying out the 25 cent coin, when it is judged that $Rc=0$ at step 1400, at step 1906, a judgement is made as to whether the content of the no pay number register $R_2$ is larger than 2. If the relation $R_2 \geqq 2$ does not hold, the program is transferred to the 25 cent coin pay out routine 1410, whose content being shown in FIG. 7. If $R_2 \geqq 2$, 10 is subtracted from the content of the 25 cent register $R_6$ and 10 is added to the content of 10 cent register $R_B$. Then at step 1411, a judgement is made as to whether the content of the 25 cent register Rc is larger than 10 or not. If $Rc \geqq 10$, 10 subtracted from the content of Rc, and 10 is added to the content of $R_B$. These processings are continued until a relation $Rc \geqq 10$ does not hold at step 1411. When $Rc \geqq 10$ does not hold, at step 1412, a judgement is made as to whether the content of the 25 cent register Rc is 0 or not. When $Rc=0$, the content of the 25 cent register Rc is changed to 0 and the content of the 25 cent coin remaining number register $R_{CN}$ is changed to 0. If $Rc \neq 0$, 5 is added to the content of the 5 cent register $R_A$ and 0 is added to the contents of Rc and $R_{CN}$. Then the program is transferred to return money coin selection routine 1413. This routine 1413 is shown in FIG. 7. More particularly, even when 25 cent coin is payed out twice, the pay out of the 25 cent coins is not confirmed, and instead of the 25 cent coin, 10 cent and 5 cent coins are payed out.

When it is judged that there is a inventory input in the subroutines 108, 110, 118 shown in FIG. 2 or in the subroutine 1346 shown in FIG. 6 the program is transferred to the inventory routine 119. The inventory operation utilizing this routine will be described as follows:

Inventory Operation

Figure 4:
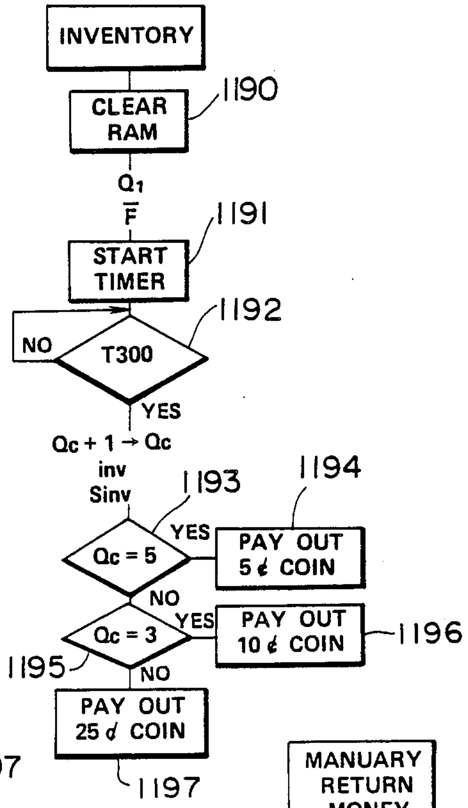

The inventory routine is shown in FIG. 4 in which at step 1190, a randam access memory device (RAM) is cleared. Then flag $Q_1$ is set, flag F is reset, and at step 1191 various timers are started. Then at step 1192, a judgement is made as to whether the 300 ms timer has timed up. If not, the program is returned again to step 1192. If the 300 ms timer has timed up, 1 is added to the content of the inventory register $A_C$. Then flags inv and $S_{inv}$ are set. Then at step 1193, a judgement is made as to whether the content of the inventory register $Q_C$ is 5 or not. At this time, since $Q_C=1$ , the result of judgement is NO. Then at step 1195, a judgement is made as to whether the content of the inventory register $Q_C$ is 3 or not. Again the result of judgement is NO so that the program is transferred to the 25 cent coin pay out routine 1197, the content thereof being shown in FIG. 7. This routine 1197 is different from the 25 cent pay out routine described above in that the routine 1197 does not contain a processing of adding 1 to the content of the no pay number register $R_2$. At this time, since flags inv and $Q_1$ are set, the processing, of subroutne 1358 and 1362 are different slightly. In the subroutine flow chart shown in FIG. 17, at step 1387, it is judged that the flag inv is "1" so that the result of judgement is YES, thus completing this subroutine. In the subroutine flow chart shown in FIG. 15, at step 1393, it is judged that $Q_1=1$. Then at step 1394 the flag $S_{inv}$ is judged. At this time, since $s_{inv}=1$, the subroutine is completed without executing any procedure. Further, since flag $Q_1$ has been set, the program is branched to step 1374 from step 1366 shown in FIG. 7. At step 1374, flag RP is judged. At this time, if flag RP is 1, in other words already payed out return coin has confirmed, then flag RP is reset, and at step 1380, various timers are started. After that at step 1381, a judgement is made as to whether the 300 ms timer has timed up. If timed up, at step 1382, signal S(RP) from the payed out confirmation switch PS is judged. If at this time, the signal S(RP) is still "9", after executing the subroutine 1383, the program is returned to step 1382. The subroutine 1383 is shown in FIG. 15. Where signal S(inv) from an inventory switch, not shown, is "1", the same processings as above described are executed, whereas when the signal S(inv) is "0", at step 1395, it is judged that signal S(inv)=1 and flag $S_{inv}$ is reset.

At step 1382, when signal S(RP) is "1", that is the pay out coin confirmation switch PS is in the waiting state, the program is branched to step 1398 for judging flag $Q_1$. At this tiem, since flag $Q_1$ is "1", at the next step 1397, the content of the inventory register $Q_C$ is judged. At this time, since $Q_C=1$, the program is transferred to the 25 cent pay out routine 1352.

In this manner, 25 cent coins are succesively payed out. During this pay out operation, if there is no remaining 25 cent coin and at step 1358 when money return confirmation is not made, flag RP would not be set. Then the program is transferred from step 1374 to step 1375. When money return is confirmed, flag RP is reset, and the program is transferred to the timer starting step 1380 described above. At step 1375, if the money return is not confirmed, at the next step 1376, a judgement is made as whether the 300 ms timer has timed up or not. If the result of judgement is NO, the program is transferred to subroutine 1377 shown in FIG. 15. At this time, if the signal S(inv) from the inventory switch is "1", this subroutine is completed, whereas when the signal S(inv) is "0", this subroutine would be completed only after resetting flag $S_{inv}$. Upon completion of subroutine 1377, at step 1378, flag $Q_1$ is judged. Since at this time, the flag $Q_1$ is "1", the program is returned to step 1375 to repeat the operation described above.

At step 1376, if it is judged that the 300 ms timer has timed up, at step 1379, the content of the inventory register $Q_C$ is judged. At this time, since $Q_C=1$, the program is transferred to 25 cent pay out routine 1352 to continue the 25 cent pay out operation.

When the inventory switch is open and either one of the subroutines 1362, 1377 and 1383 detects that signal S(inv) has returned to "0", at step 1395 shown in FIG. 15, it is judged that S(inv)=0 and the flag $S_{inv}$ is reset. In the succeeding subroutines 1362, 1377 and 1383, at step 1394, the flag $S_{inv}$ is judged "0" and the program is transferred from step 1394 to step 1396. Under this state the inventory switch is closed again to change signal S(inv) to "1". This state is judged at step 1396 shown in FIG. 15. Thereafter 1 is added to the content of the inventory register $Q_C$ and flag $Q_1$ is reset. At step 1397, a judgement is made as to whether the content of the inventory register $Q_C$ is 6 or not. In this case, since $Q_C=2$ and $Q\neq 6$, this subroutine is finished. As flag $Q_1$ is reset, this state is detected at either one of the steps 1366, 1378 and 1398. More particularly, at step 1366, when $Q_1$ is "0", at the next step 1367, the flag inv is judged. At this time, since flag inv is "1", the flag RP is then reset and the program is transferred to step 103 shown in FIG. 2 where $Q_1$ is "0" at step 1378 on 1379, it is judged that $Q_1=0$ at step 1378 or 1398 and then the program is transferred to step 103 shown in FIG. 103.

Then, in the subroutine 108 or 110, it is judged that there is an inventory input, and the program is transferred to inventory routine 119 in which RAM is cleared at step 1190, flag $Q_1$ is set, flag F is reset and timers are started at steps 1191 and 1192, whereby 1 is added to $Q_C$. Thus, the content of the inventory registor $Q_C$ becomes 3. Then, flags inv and $S_{inv}$ are set. At step 1193, since $Q_C=3$, it is judged NO and at step 1195, a judgement is made as to whether $Q_C=3$ or not. This time since $Q_C=3$ the result of judgement is YES and the program is transferred to the 10 cent coin pay out routine 1196 which is shown in FIG. 7. This routine 1196 is similar to the 25 cent coin pay out routine described above except that after judging $Q_C=3$ at step 1379, the routine is transferred to the 10 cent coin pay out routine 1353.

When the pay out operation of the 10 cent coins is completed and the opened inventory switch is closed again, the program is transferred to the inventory routine 119 shown in FIG. 2, the content thereof being shown in FIG. 4. In this routine, 1 is added to the content of the inventory registor $Q_C$, thus changing the content to 5. As a consequence, the result of judgement at step 1193 is YES and the program is transferred to the 5 cent coin pay out routine 1194, the content thereof being shown in FIG. 7. This routine 1194 is similar to the 25 cent coin pay out routine and the 10 cent coin pay out routine described above except that it is judged that $Q_C=5$ at step 1379 when paying out operation of the 5 cent coins is completed and when the inventory switch is closed again. The content of register $Q_C$ becomes 6 by the addition of 1 executed in either one of the subroutines 1362, 1377 and 1383. At the succeeding step 1397, it is judged that $Q_C=6$ and then the content of the inventory registor $Q_C$ is changed to 0, thereby completing the inventory operation.

At step 121 shown in FIG. 2, it is judged that flag MP=1 and the program is transferred to a manual money return routine 122 which is executed as follows:

Manual Money Return Operation

Figure 5:
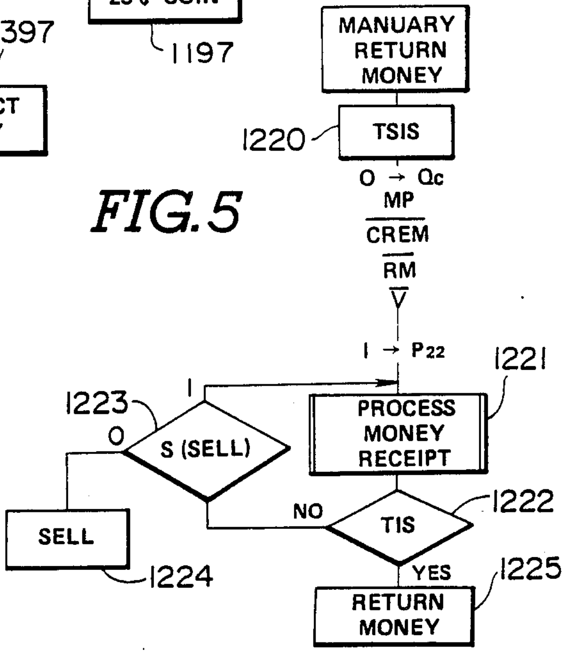

The manual money return operation is shown in FIG. 5 in which at step 1220, the 1 ms timer is started. Then the content of the inventory register $Q_C$ is changed to 0, flag MP is set, generation of signal CREM is stopped, flag RM is reset, the selling enabling signal V is stopped and the terminal $P_{22}$ is changed to "1". Then the program is transferred to the money receipt processing subroutine 1221, the content thereof being shown in FIG. 9. The detail thereof has already been described. Upon completion of the money receipt processing subroutine 1221, at the next step 1222, a judgement is made as to whether the 1 s timer has timed up or not.

When the result of judgement is YES, the program is transferred to the money return routine 1225 which is shown in FIG. 6 and has been described in detail. When the result of judgement executed at step 1222 is NO, at the next step 1223, a selling starting signal S(SELL) is judged. As above described, this signal S(SELL) is "1" in the waiting state, but becomes "0" when the selling of a merchandize is started. At step 1223, when signal S(SEL,L) is "0", that is the selling of the merchandise has been started, the program is transferred to the selling routine 1224, whereas when the selling of the merchandise is not yet started, the program is returned to the money receipt processing subroutine 1221 which is shown in FIG. 3 and has been described in detail.

Although in the foregoing embodiment, 5 cent, 10 cent and 25 cent coins and 1 dollar paper money were used for insertion into the vending machine and 5 cent, 10 cent and 25 cent coins were used as the change, it should be understood that the invention is not limited to such specific types of money. For example, 100 Yen coin, 50 Yen coin, and 1000 Yen paper money can be used for insertion, and 10 Yen coin, 50 yen coin, 100 Yen coin and 500 Yen coin can be used as change coins. Further, in the above described embodiment, the invention was described with the aid of flow charts to obtain better understanding of the invention. The hardware utilized to carry out the invention will be obvious to those skilled in the art. For example, various registers can be constructed by using an address region of a suitable memory means or a suitable counter, and various flags may be constructed by using any one bit area of a suitable memory means. Various judgement and calculations can be made with a suitable arithmetic operating means, for example a well known central processing unit (CPU) sequentially controlled by a suitable program. Since signals from various switches contains ripples, it is advantages to execute necessary judgements and calculations after removing the ripples.

As above described, the control system of this invention is constructed such that a judgement is made as to whether a selling requiring paying of a change is possible and then a selling enabling signal is generated by executing a calculation as if memory is returned by using various types of money. For this reason, it is possible to judge the possibility of selling by the maximum utilization of inserted money and already accommodated money, which greatly increases the chance of selling of an automatic vending machine. Further according to this invention, even when the type of money inserted and returned or the selling price are changed, such change can be readily coped with without greatly changing hardware.

What is claimed is

1. A control system of a vending machine comrising:

a plurality of switch means provided for respective denominations of money and operated when inserted monies pass through said switch means;

first register means for storing a value corresponding to inserted amount for each denomination;

means for adding a value corresponding to the number of operations for each of said switch means to the contents of said first register means for each denomination;

a second register means for storing a value corresponding the amount of money to be used as change for each denomination;

means for adding a predetermined value to the contents of said second register means for each denomination upon insertion of monies;

means for subtracting said predetermined value from the content of said second register means for each denomination upon paying out of monies;

means for subtracting a selling price of a merchandize from a total amount of inserted monies for calculating an amount of change;

means for sequentially subtracting each denomination value starting from the highest denomination within the content of said second register from said calculated amount of change thereby judging whether selling is possible or not and generating a selling enabling signal when selling is possible;

means for sequentially changing the content of said first register means from a higher denomination to a lower denomination until the content of said first register means corresponding to the lowest denomination exceeds said selling price;

means for subtracting said selling price from said content of said first register means corresponding to the lowest denomination, thereby setting said content to a value corresponding an amount of change for each denomination; and means for paying out money based on said content of said first register for each denominations.

2. The control system according to claim 1 wherein said first register means comprises a plurality of registers corresponding to each denomination.

3. The control system according to claim 1 wherein said means for adding a value corresponding to the number of operations for each of said switch means to the contents of said first register means for each denomination includes means for adding an amount of money corresponding to an operated one of said switch means to the content of said first register means corresponding to denomination when said switch means resets within a definite time after operation.

4. The control system according to claim 1 wherein said second register means comprises a plurality of registers corresponding to each denomination for change monies.

5. The control system according to claim 1, further comprising:

empty switch means for detecting the fact that the change money has decreased below a predetermined amount;

means for calculating an amount of change by subtracting the selling price from a total sum of inserted monies when said empty switch detects available change, thereby generating said selling enable signal when selling is possible;

means for calculating amount of change by subtracting said selling price from the total sum of said inserted money when said empty switch detects that there is no change;

means for judging whether selling is possible or not by sequentially subtracting the amounts of said monies starting from a higher denomination, thus generating said selling enabling signal where selling is possible.

6. The control system according to claim 5 wherein said empty switch means is positioned at a predetermined height of a tube accommodating change coins of the lowest price for detecting presence or absence of said coin at said height.

* * * * *